(12) United States Patent
Yoshida et al.

(10) Patent No.: US 8,015,750 B2
(45) Date of Patent: Sep. 13, 2011

(54) STRUCTURE OF FIXING PLANTING BASE

(75) Inventors: Minoru Yoshida, Yamato (JP); Kazuo Kumura, Yamato (JP); Takaharu Yoshioka, Sagamihara (JP); Yasuyuki Ueda, Kamagaya (JP)

(73) Assignee: Kyodo Ky-Tee Corp., Tokyo (JP)

( * ) Notice: Subject to any disclaimer, the term of this patent is extended or adjusted under 35 U.S.C. 154(b) by 284 days.

(21) Appl. No.: 12/085,960

(22) PCT Filed: Oct. 20, 2006

(86) PCT No.: PCT/JP2006/321460
§ 371 (c)(1),
(2), (4) Date: Jun. 3, 2008

(87) PCT Pub. No.: WO2007/069395
PCT Pub. Date: Jun. 21, 2007

(65) Prior Publication Data
US 2009/0158652 A1 Jun. 25, 2009

(30) Foreign Application Priority Data

Dec. 14, 2005 (JP) ................. 2005-360047

(51) Int. Cl.
*A01G 9/02* (2006.01)
(52) U.S. Cl. ....................................................... 47/65.9
(58) Field of Classification Search ................ 47/65.9
See application file for complete search history.

(56) References Cited

U.S. PATENT DOCUMENTS 5,673,513 A * 10/1997 Casimaty .................. 47/65.9
2009/0158652 A1 * 6/2009 Yoshida et al. ............. 47/65.9

FOREIGN PATENT DOCUMENTS

| JP | 2002-281843 | | 10/2002 |
|---|---|---|---|
| JP | 2003092923 | * | 2/2003 |

(Continued)

OTHER PUBLICATIONS

International Seach Report mailed Dec. 12, 2006, issued on PCT/JP2006/321460.

*Primary Examiner* — Frank T Palo
(74) *Attorney, Agent, or Firm* — Edwards Angell Palmer & Dodge LLP

(57) ABSTRACT

A structure for fixing a planting base 100 supporting a planted raising member 106 by a bottom plate 101 to a laying face 300, the structure being provided with a cylinder portion 105 which projects from the bottom plate 101 of the planting base 100 to a top side and top and bottom of which are opened in which an inner diameter is gradually contracted from a top end to a bottom side, a bolt 110 constituting a fixing member is inserted to the cylinder portion 105, the bolt 110 is screwed to and fixed by an anchor holder 120 of the laying face 300 until a position at which a bolt head portion 110a is brought into contact with and caught by an inner face of the cylinder portion 105, and a top face of the bolt head portion 110a is arranged at a height the same as that of a top end of the cylinder portion 105, or arranged at inside of the cylinder portion 105.

13 Claims, 19 Drawing Sheets

FOREIGN PATENT DOCUMENTS

| | | |
|---|---|---|
| JP | 2003-092923 | 4/2003 |
| JP | 2003-116356 | 4/2003 |
| JP | 2003-116359 | 4/2003 |
| JP | 2003-219729 | 8/2003 |
| JP | 2003-250354 | 9/2003 |
| JP | 2004-016015 | 1/2004 |
| WO | WO9101412 * | 2/1991 |

* cited by examiner

STRUCTURE OF FIXING PLANTING BASE

FIELD OF THE INVENTION

The present invention relates to a structure for fixing a planting base supporting a planting portion at a bottom portion thereof to a laying face.

DESCRIPTION OF THE RELATED ART

Although urban areas of the present age society lack being close to nature, in order to compensate for not being close to nature to meet a desire of human beings to be close to nature, a greening measure in the urban area is achieved by providing a planting equipment of artificially greening, for example, a rooftop of a building, a roof of a building of a folded plate roof or the like, a veranda, a terrace or the like. Although various planting equipments have been proposed, there is known a planting equipment using a planting base for supporting a planting portion at a bottom portion thereof as one thereof. According to the planting equipment, a light-weight planting base is used in view from a load resistance of a building, and therefore, it is preferable to fix the planting base to the laying face. There are Patent References 1 through 5 as background art technical references disclosing a planting equipment for fixing such a planting base at a laying face.

Patent Reference 1 (JP-A-2003-250354) discloses a structure having a planting portion and a draining portion, including a plurality of trays (planting bases) arranged contiguously to each other, and a plurality of fixing pieces arranged between corner portions of the trays and attached to a floor face for fixing the trays, the fixing piece is constituted by a base member adhered to be attached to the floor face, a position restricting member erected on a top face of the base member, and a drawout preventing member attachably and detachably fixed to and from an upper end of the position restricting member, the position restricting member is engaged with the corner portion of the tray to restrict movement of the tray in a front and rear direction and a left and right direction, and the drawout preventing member restricts the tray from moving to a top side.

Patent Reference 2 (JP-A-2003-116356), Patent Reference 3 (JP-A-2004-16015) disclose a structure in which corner side faces are provided at a soil containable planting tray (planting base) substantially in a square shape in a plane view thereof formed by a bottom face and side faces by facing four corners thereof, a rectangular space is formed by the corner side faces of 4 pieces of the planting trays contiguous to each other, a fixing bolt erected at a water proof sheet laid on top of a roof is arranged at the rectangular space, a holding metal piece is attached to the fixing bolt by making an upper edge of the corner side face of the planting tray caught by a holding portion thereof, and the planting tray is fixed to the roof.

Patent Reference 4 (JP-A-2003-219729) discloses a structure in which a fixing portion in a shape of a sucking disk and an attaching projected portion projected orthogonally to the fixing portion are integrally formed by a synthetic resin, the fixing portion is welded or adhered to a top face of a waterproof layer, a planting mat (planting base) or a planting tray and a planting mat (planting base) are installed from above a fixing member, a locking member is attached to an attaching projected portion of the fixing member, and the planting mat or the planting tray and the planting mat are squeezed by the locking member and the fixing portion of the fixing member.

SUMMARY OF THE INVENTION

Meanwhile, when the planting bases are fixed between the corner portions of the outer sides of the planting bases as described in Patent References 1 through 3, there are drawbacks, such as (1) a number of pieces of the fixing pieces is increased to increase cost, (2) the planting base is shifted by an impact and is disengaged from the fixing, (3) when an unevenness of a stepped difference or the like is present at the laying face, a stepped difference is brought about at a top face of the planting base at the corner portion, and a fixing strength by the fixing piece is dispersed among the respective planting bases, (4) an outlook is deteriorated by providing a large member optically recognized from a top side of a planting equipment of a drawout preventing member or the like or a member projected considerably to a top side of the planting base. On the other hand, according to the fixing structure of Patent Reference 4, the planting base (planting mat or planting tray) is fixed at inside of the planting base, and therefore, although the problems of (1) through (3) can be resolved, the problem of (4) cannot be resolved.

The invention is proposed in view of the above-described problems and it is an object thereof to provide a structure for fixing a planting base with an excellent construction performance without deteriorating an outlook of a planting equipment.

A structure of fixing a planting base of the invention supports a planted or plantable planting portion by a bottom portion thereof to a laying face, wherein a fixing member is inserted into a cylinder portion which is projected from a bottom portion of the planting base and a top and a bottom side of which are opened, the inserted fixing member is fixed to the laying face by fixing the fixing member directly to the laying face or fixing the fixing member to an interposing member fixedly attached to the laying face, and a top end of the fixing member in the fixed state is arranged at a height substantially the same as a height of a top end of the cylinder portion or arranged in the cylinder portion such that the top end of the cylinder portion and the top end of the fixing member constitute substantially the same plane. According to the above-described constitution, for example, the planting portion may be constituted by a raising member layer and a planting mat arranged on a top side of the raising member layer, and the top end of the cylinder portion may be arranged at a height substantially the same as that of the upper end of the raising member layer as is substantially constituting the same flat face or more or less on a top side thereof.

Further, the structure of fixing a planting base of the invention is characterized in that an inner diameter of the cylinder portion is contracted from an upper end to a bottom side.

Further, the structure of fixing the planting base of the invention is characterized in that a locking portion of the fixing member is locked by a portion in the cylinder portion the diameter of which is contracted. For example, when the fixing member is constituted by a bolt, and the locking portion is constituted by a bolt head portion, the head portion (locking portion) is locked by the diameter contracting portion at a predetermined position at inside of the cylinder portion, and a position of inserting the bolt relative to the cylinder portion is made to be able to be set by being locked thereby.

Further, the structure of fixing the planting base of the invention is characterized in that an inner portion of the cylinder portion is formed with a locking receive portion by which a locking portion of the fixing member is locked. For example, when the fixing member is constituted by a bolt, and the locking portion is constituted by a bolt head portion, the bolt head portion (locking portion) is locked by the locking receive portion at a predetermined position at inside of the cylinder portion, the bolt is inserted to a through hole bored at the locking receive portion, and a position of inserting the bolt relative to the cylinder portion is made to be able to be set by being locked thereby.

Further, the structure of fixing the planting base of the invention is characterized in that the planting base is mounted to a water storing portion or a water holding portion and a cylinder portion of the water storing portion or the water holding portion formed at a position in correspondence with the cylinder portion of the planting base is communicated with the cylinder portion of the planting base, the communicated cylinder portion is arranged with the fixing member or the fixing member and an interposing member and the planting base or the water storing portion or the water holding portion are fixed to the laying face. For example, a cylinder portion of a planting container arranged on a top side and the cylinder portion of the water storing portion of the water storing tray or the like arranged on a bottom side are communicated, a series of spaces are formed from a top end of the cylinder portion of the planting container to the laying face by communicating the cylinder portions, the spaces are provided with the fixing member of a bolt or the like and the interposing member as necessary and the planting container and the water storing portion are fixed to the laying face.

Further, the structure of fixing the planting base of the invention is characterized in that the interposing member is constituted by a slender shape and a plurality of the planting bases are fixed to the single interposing member. For example, when the planting base is constituted by a planting container, and the interposing member is constituted by substantially a shape of a square cylinder, the interposing member substantially in the shape of the square pillar fixedly attached to the laying face is fixed with a plurality of two pieces or more of the planting containers.

Further, the invention includes a constitution formed into a higher concept by changing a partial constitution of each invention or embodiment to a constitution of other invention or embodiment or the like, or adding other constitution to each invention or embodiment, or deleting a partial constitution of each invention or embodiment to a limit of achieving partial operation and effect.

According to the structure of fixing the planting base of the invention, by arranging the top end of the fixing member at a height substantially the same as that of the top end of the cylinder portion or at inside of the cylinder portion, the cylinder portion of the fixing member can be made to be difficult to be optically recognized by a plant substantially covering the top end of the cylinder portion, and an excellent outlook of a planting equipment can be maintained. Further, by fixing the structure at inside of the cylinder portion isolated from the raising member, a degree of freedom of a construction procedure can be promoted such that the structure is fixed after providing the raising member at, for example, an outer periphery of the cylinder portion, or providing the raising member at the outer periphery of the cylinder portion after fixing the structure by the fixing member or the like, also removal of the structure after having been fixed temporarily is facilitated and a high construction performance is achieved.

Further, by fixing the structure not on an outer side of the corner portion of the planting base but at inside of the planting base, there is achieved an effect of capable of constituting the structure of low cost formation by reducing a number of pieces of fixing pieces, capable of fixing the structure firmly by high strength without shifting the planting base by an impact and disengaging the structure from being fixed, and capable of restraining a dispersion in a fixing strength of each planting base even when there is an unevenness of the stepped difference is present at the laying face. Further, although according to the structure of being fixed by an outer side of the corner portion, a very delicate adjustment is needed, for example, when the planting tray made of a resin or the like is laid by adhering the base portion to a portion disposed at a corner by carrying out marking, the planting tray is elongated by weather or temperature in construction and a necessary position of installing the base portion differs from a result of the marking, it is necessary to carry out the marking again, the fixing operation can be facilitated with no need of carrying out the marking again.

Further, by contracting the inner diameter from the top end of the cylinder portion of the planting base to the bottom side, the fixing member of the bolt or the like is easy to be inserted into the cylinder portion and the construction performance can be promoted. Further, the position of inserting the fixing member is made to be able to be set at inside of the cylinder portion by locking the locking portion of the fixing member at the diameter contracting portion at inside of the cylinder portion or locking the locking portion of the fixing member by the locking receive portion at inside of the cylinder portion, the construction performance can be promoted and also the removal is facilitated.

Further, by fixing the planting base and the water storing portion or the water holding portion to the laying face by arranging the fixing member or the fixing member and the interposing member to the communicated cylinder portions of the planting base and the water storing portion, the water storing portion or the like can be fixed simultaneously with an operation of fixing the planting base, the construction performance can be promoted and the water storing portion or the like can be fixed with the high strength.

Further, by constituting the interposing member by the slender shape and fixing the plurality of planting bases to the single interposing member, a number of the planting bases can be installed by installing the single interposing member, and the construction performance when the interposing member is provided can be promoted.

DETAILED DESCRIPTION OF EXEMPLARY EMBODIMENTS

An exemplary embodiment of a structure of fixing a planting base according to the invention will be explained in reference to the drawings as follows, the invention is not limited to following embodiments or exemplifications but pertinent combinations of constitutions of the respective embodiments or the exemplifications are also included in the invention.

First Embodiment

Figure 1:
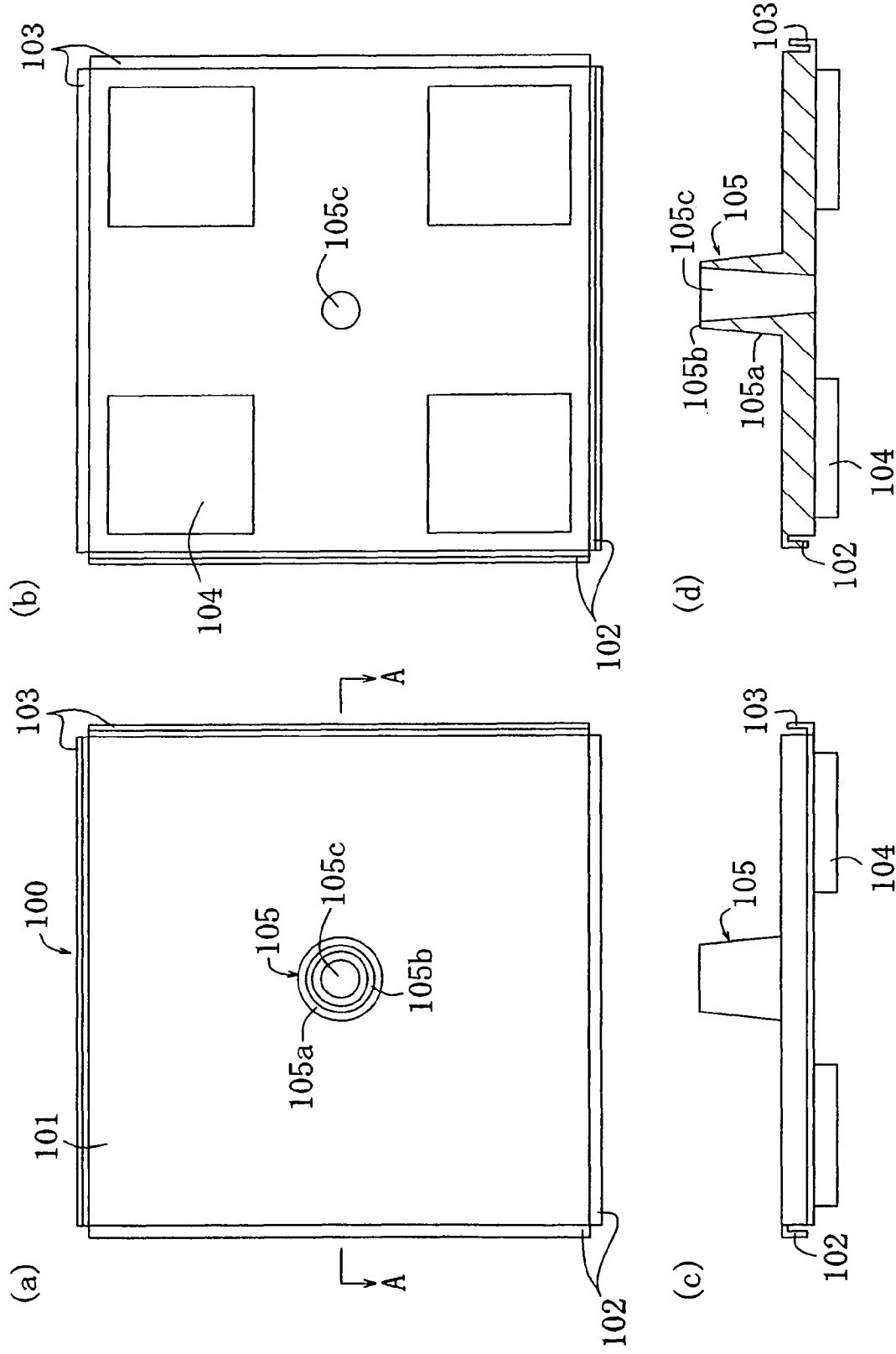
FIG. 1(a) is a plane view showing a planting base of a first embodiment.
FIG. 1(b) is a bottom view showing the planting base of FIG. 1(a)
FIG. 1(c) is a front view showing the planting base of FIG. 1(a)
FIG. 1(d) is a sectional view taken along a line A-A of the planting base.

A structure of fixing a planting base of a first embodiment fixes a planting base 100 to a laying face 300 (refer to FIG. 1 through FIG. 4). As shown by FIG. 1, the planting base 100 includes a bottom plate 101 substantially in a rectangular shape in a plane view thereof constituting a bottom portion and formed with top side engaging connect pieces 102 and bottom side engaging connect pieces 103 at four sides of the bottom plate 101 as engaging connect portions for engaging to connect the planting bases 100 contiguous to each other on four sides of the bottom plates 101. The top side engaging connect pieces 102 are formed substantially in a hook-like shape which is projected from a vicinity of a top face of the bottom plate 101 to an outer side and an end edge of which is bent to be extended to a bottom side in two sides of the bottom plate 101 contiguous to each other on one side, and the bottom side engaging connect pieces 103 are formed substantially in a hook-like shape which is projected from a vicinity of a bottom face of the bottom plate 101 to an outer side and an end edge of which is bent to be extended to a top side in two sides of the bottom plate 101 contiguous to each other on other side, and the planting bases 100.cndot.100 can be aligned to be engaged to connect to each other by fitting or engaging the top side engaging connect pieces 102 of the planting bases 100 on one side of the planting bases 100.cndot.100 contiguous to each other and the bottom side engaging connect pieces 103 of the planting base 100 on other side thereof.

Vicinities of four corners of the bottom plate 101 are formed with support legs 104 of a plate-like shape in a quadrangular shape in a bottom view thereof to form a space in correspondence with a height of the support leg 104 between the bottom face of the bottom plate 101 and the laying face 300 and extraneous water of a planting equipment is made to be able to be excellently drained by draining water by utilizing the space. Further, a center of the bottom plate 101 is formed with a cylinder portion 105 projected from a top face to a top side. The cylinder portion 105 is substantially constituted by a shape of a circular cylinder which is hollow and top and bottom sides thereof are opened and includes an outer peripheral portion 105a converged by being gradually contracted in a diameter thereof to the top side, a substantially horizontal top end face 105b, and a hole portion 105c converged by being gradually contracted in a diameter thereof to the bottom side, and the hole portion 105c is penetrated to the bottom face of the bottom plate 101 to be opened. A top end opening of the hole portion 105c is formed to be large by a diameter capable of loosely inserting a head portion 110a of a bolt 110, mentioned later, and a bottom end opening thereof is formed to be small by a diameter capable of inserting the bolt 110 and not capable of inserting the head portion 110a. Further, the planting base 100 can be formed by a pertinent material of wood, stone, steel plate or the like although the planting base 100 is preferably molded by, for example, a resin.

Figure 2:
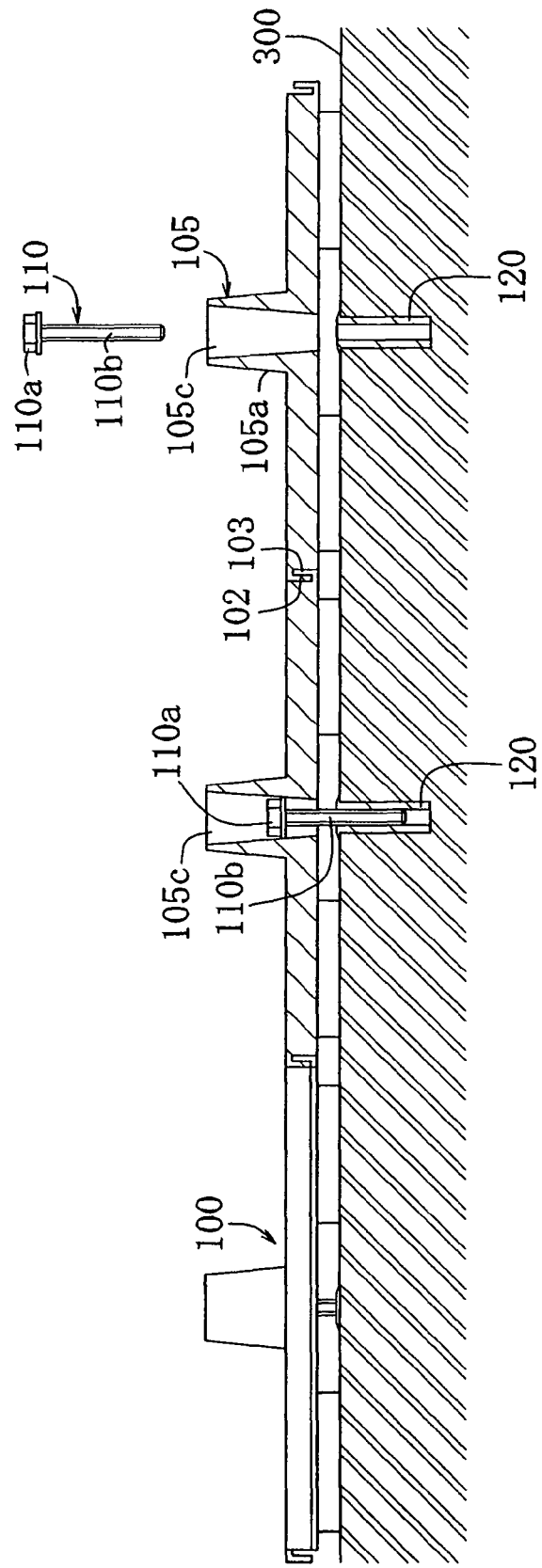
FIG. 2 is a vertical sectional explanatory view for explaining a structure of fixing the planting base of the first embodiment.
Figure 3:
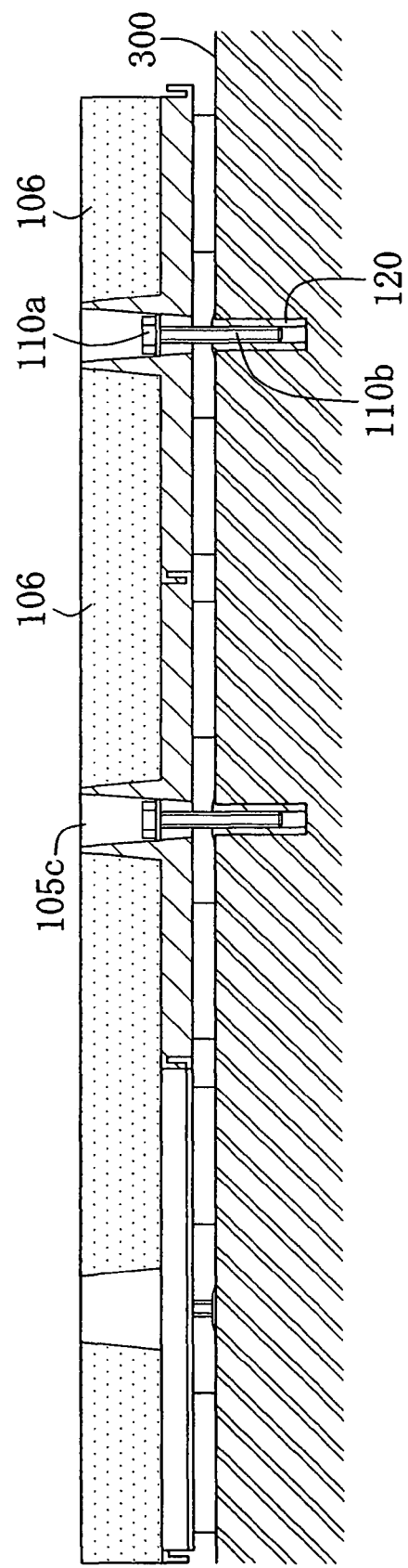
FIG. 3 is a vertically sectional view showing a state of providing a raising member at the planting base of the first embodiment.

As shown by FIG. 2, when the planting base 100 is fixed to the laying face 300, an anchor holder 120 is previously embedded at a position of the laying face 300 in correspondence with a position of arranging the hole portion 105c of each planting base 100. Further, the respective planting bases 100 are arranged such that the hole portions 105c correspond to the respective anchor holders 120, and the planting bases 100 are aligned to be laid longitudinally and transversely while engaging to connect the planting bases 100.cndot.100 contiguous to each other by the top side engaging connect pieces 102 and the bottom side engaging connect pieces 103 to form a group of the planting bases.

Thereafter, the bolt 110 constituting a fixing member is inserted from the top side to the cylinder portion 105 of the planting base 100, and a shaft portion 110b of the bolt 110 formed with a male screw is screwed to the anchor holder 120. At that occasion, the hole portion 105c is contracted in a diameter gradually to the bottom side, an opening portion of the lower end of the hole portion 105c is smaller than the outer periphery of the head portion 110a, and therefore, the head portion 110a is brought into contact with an inner face of the cylinder portion to be caught thereby at a predetermined position at inside of the hole portion 105c and the bolt 110 is screwed up to the position to finish fixing. An operation of fixing the bolt 110 and the anchor holder 120 is carried out for all of the planting bases 110 to fix all of the planting bases, 110 to the laying face 300.

Figure 4:
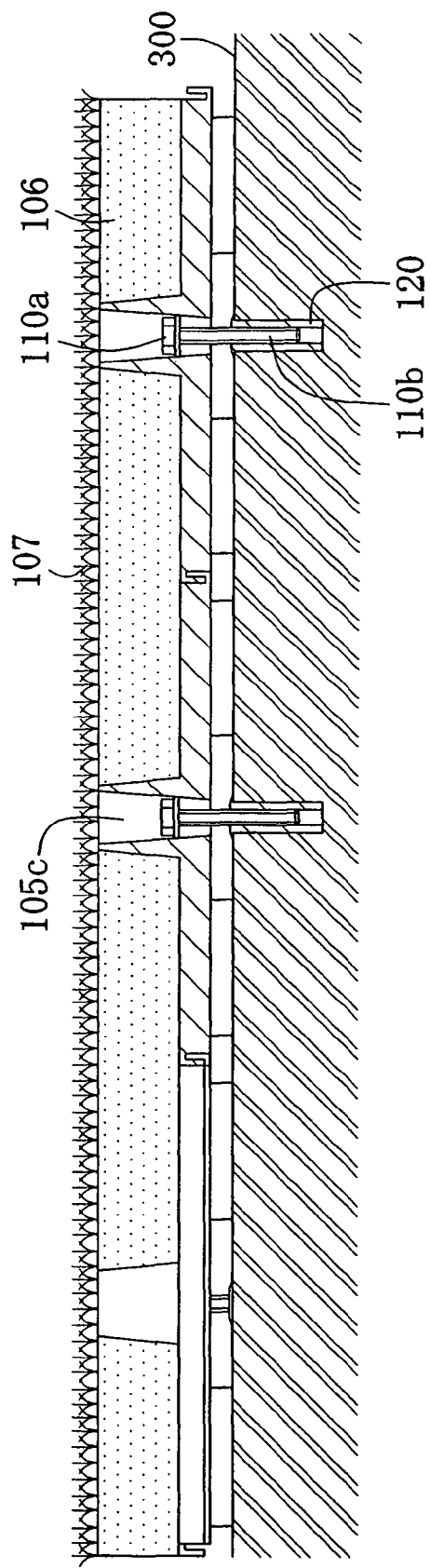
FIG. 4 is a vertical sectional view showing a state of planting at the planting base of the first embodiment.

Further, a raising member 106 is laid above the bottom plate 101 of the planting base 100 to a degree by which the top face becomes substantially flush with the upper end face 105b of the cylinder portion 105 (refer to FIG. 3) and planting is carried out by planting a plant 107 of turf or the like at the laid raising member 106, or mounting a planting mat of cut turf or the like above the raising member 106 (refer to FIG. 4).

Further, although one of the raising members 106 can be used, when the planting equipment is provided at a roof top, or a veranda or the like, it is preferable to make the equipment as light-weighted as possible, and the raising member 106 can be constituted by, for example, perlite, vermiculite, peatmoss, burk compost, chafcon, woody decomposed organic substance, zeolite or the like, building waste, sewage or purifying sludge or the like, or palm fiber or the like. Further, several kinds of the exemplified raising members, or root decomposition preventing silicate clay or the like may pertinently be selected as necessary in accordance with a kind, an environment or the like of planting, which may constitute a light-weighted raising member or the like blended therewith excellent balance in order to improve water holding property, water draining property, air permeability, and by adopting such a light-weight raising member having excellent permeability or the like, the root of the plant 107 can be prevented from being decomposed. Further, because a load by a lightweight raising member is, for example, about 1/3 that of a related art, an increase in a load on the laying face 300 can be alleviated by using a light-weighted raising member. Further, a raising member 106a unitized by constituting the solidified raising member 106 or palm fiber in a mat-like shape may be used (refer to FIG. 5), by using unitized raising member 106a, construction performance can further be promoted, when the planting equipment is removed, an operation of removing the raising member 106a, and therefore, removing the bolt is facilitated and low cost formation of construction or removing can be achieved.

Figure 5:
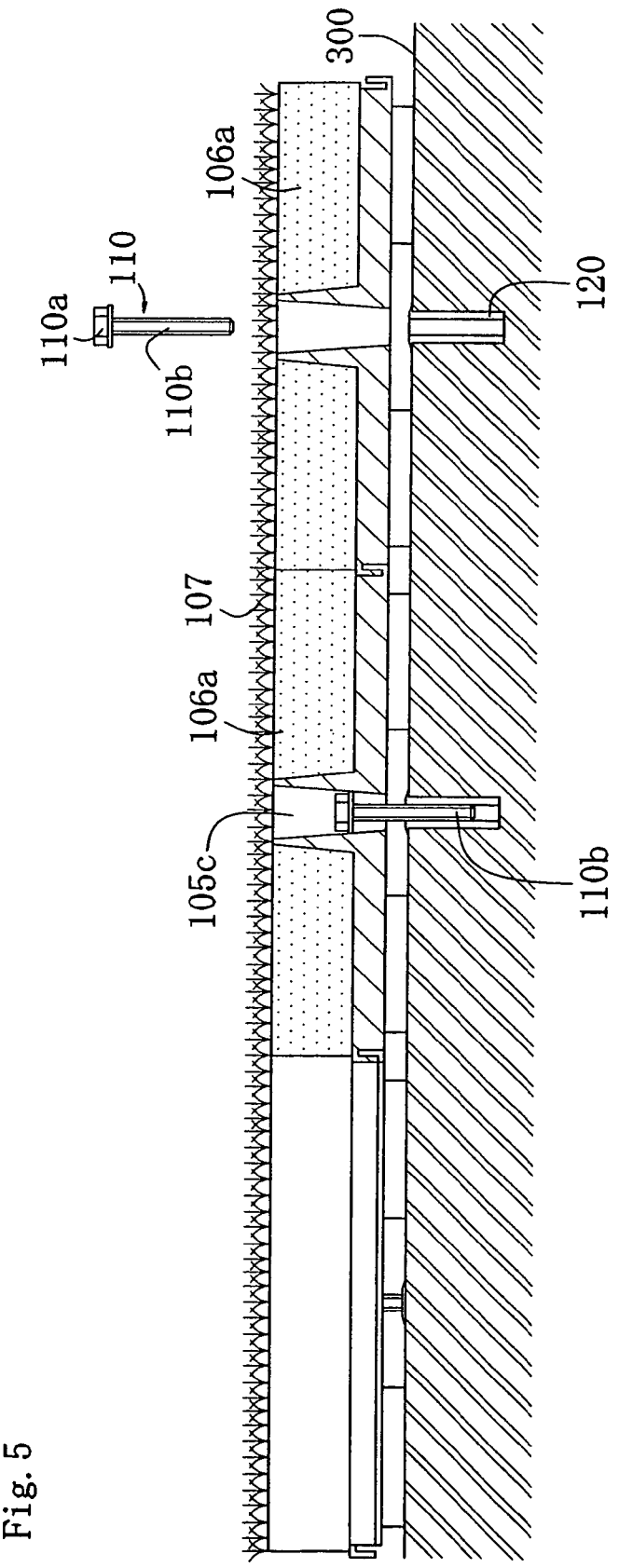
FIG. 5 is a vertical sectional explanatory view for explaining a fixing structure of a modified example of the planting base of the first embodiment.

Further, the planting base 100 is not necessarily limited to be fixed before laying the raising member 106 but, as shown by, for example, FIG. 5, the planting base 110 is fixed pertinently by fixing the planting base 100 by inserting the bolt 110 into the cylinder portion 105 after planting the plant 107 by laying the raising member 106 or laying or planting the raising member 106 simultaneously in parallel with successively promoting an operation of fixing the planting bases 110 aligned to be arranged.

According to the structure of fixing the planting base 100 of the first embodiment, the head 110a of the bolt 110 constituting a fixing member is arranged at inside of the cylinder portion 105, further, also the cylinder portion 105 is substantially covered by the raising member 106 and the plant 107, and therefore, a member projected to the top side from the planting face or a member significantly exposed at the planting base are not present, and therefore, an outlook of the planting equipment is not deteriorated. Further, a degree of freedom of a construction procedure can be promoted such that, for example, the equipment is fixed by the bolt 110 after providing the raising member 106 at an outer periphery of the cylinder portion 105 or providing the raising member 106 at the outer periphery of the cylinder portion 105 after fixing the equipment by the bolt 110 by fixing the equipment by the bolt at inside of the cylinder portion 105 isolated from the raising member 106, removal after temporarily fixing the equipment is facilitated and the high construction performance is provided. Further, the hole portion 105c of the cylinder portion 105 is gradually enlarged in the diameter to the top side, and therefore, the fixing member of the bolt 110 or the like can smoothly be inserted into the hole portion 105c. Further, the outer peripheral portion 105a of the cylinder portion 105 is gradually enlarged in the diameter to the bottom side, and therefore, the raising member 106 can easily be laid, and the raising member 106 can be provided by a density without nonuniformity at, for example, a vicinity of the lower end of the outer peripheral portion 105a.

Further, the planting base 110 is very solidly fixed to the laying face 300 by screwing the bolt 110 and the anchor holder 120 or locking the head portion 110a to the hole portion 105c, and therefore, the planting base 100 is not scattered given by strong wind of, for example, typhoon or the like and the planting equipment 100 can stably be installed over a long period of time. Further, top and bottom sides of the cylinder portion 105 are opened, and therefore, when the raising member 106 is laid, the raising member 106 can be prevented from being clogged into the cylinder portion 105, for example, the fixing operation by the bolt 110 after laying the raising member 106 is not hampered by clogging the raising member 106. Particularly, the hole portion 105c of the example is constituted by a shape a diameter of which is gradually contracted in a taper shape in a sectional view thereof, and therefore, the raising member 106 is dropped smoothly to the bottom side without being stagnated at inside of the hole portion 105c.

Second Embodiment

A structure of fixing a planting base according to a second embodiment will be explained in details of a portion thereof which differs from the first embodiment.

Figure 6:
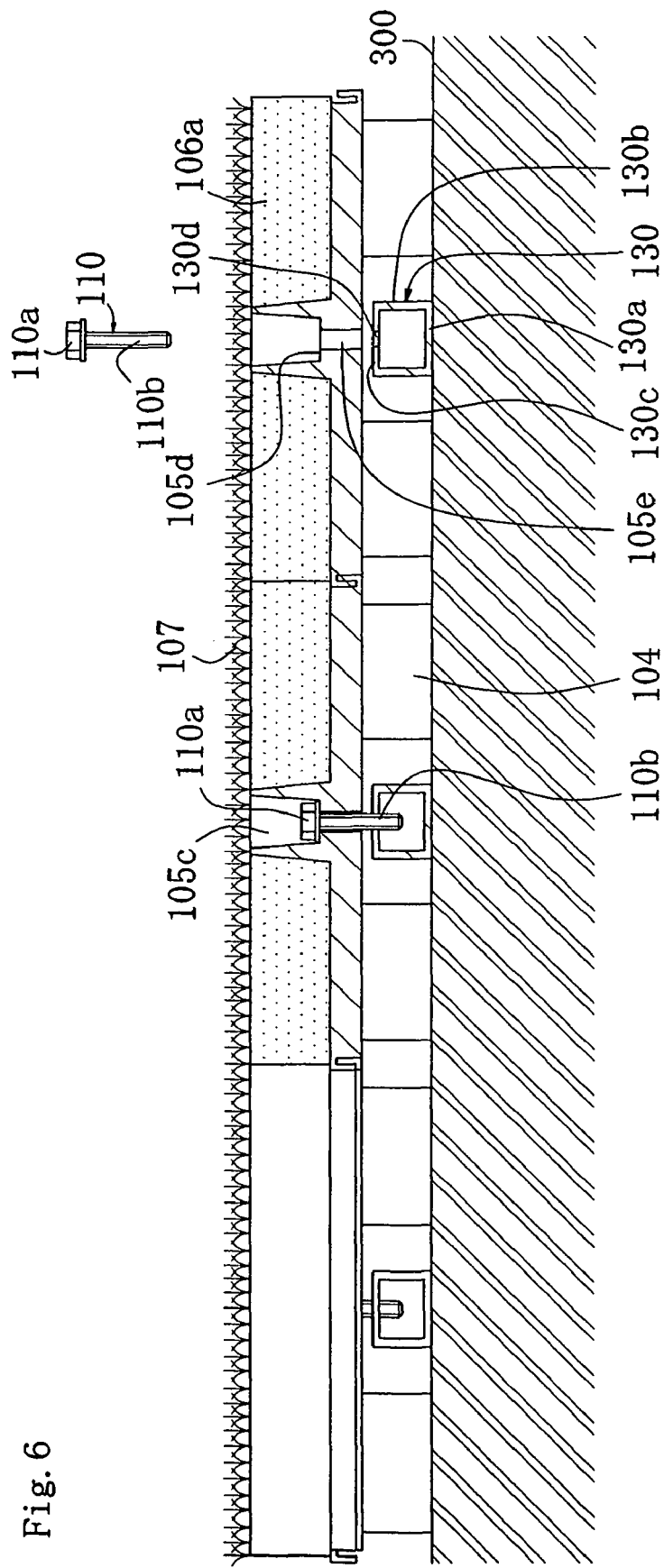
FIG. 6 is a vertical sectional explanatory view for explaining a fixing structure of a planting base of a second embodiment.

In the planting base 100 according to the second embodiment, as shown by FIG. 6, the support leg 104 is formed by a shape of a rectangular parallelepiped higher than that of the first embodiment, a locking receiving portion 105d of a horizontal face is formed at a predetermined position at inside of the hole portion 105c in the diameter of the inner peripheral face of which is gradually contracted from the upper end face 105b, a through hole 105e opened at a center of the locking receiving portion 105d and penetrated to the bottom side by substantially the same diameter is formed, and the diameter of the hole portion 105c is narrowed in a stepped shape to the bottom side. Although the opening portion at the upper end of the cylinder portion 105 is larger than the bolt head portion 110a and can insert the head portion 110a, a diameter of the through hole 105e is larger than that of the bolt shaft portion 110b and smaller than the bolt head portion 110a and can insert only the bolt shaft portion 110b, and the bolt head portion 110a is locked at a predetermined position by being caught by the locking receiving portion 105d.

Further, the laying face 300 is provided with an interposing member 130 at a position in correspondence with the cylinder portion 105 of the planting base 100. The interposing member 130 is constituted by substantially a hollow square cylinder, a bottom plate 130a thereof is fixed to the laying face 300 by an adhering agent or a both faces tape or the like, a top plate 130c supported by side walls 130b erected from both side ends of the bottom plate 130a is formed with a plurality of female screw portions 130d screwed with the shaft portion 110b of the bolt 110 to be spaced apart from each other by predetermined intervals in a longitudinal direction.

When the planting base 100 is installed at the laying face 300, the respective planting bases 100 are arranged by corresponding the cylinder portions 105 to the female screw portions 130d of the interposing members 130 fixedly attached previously to the laying face 300, the bolt 110 is inserted to the hole portion 105c of the planting base 100, and the bolt shaft portion 110b penetrating the through hole 105e is screwed to the female screw portion 130d of the interposing member 130. The bolt 110 is screwed until the head portion 110a is locked by the locking receiving portion 105d, by fixing the bolt 110 to the interposing member 130, the planting base 100 the bolt head portion 110a of which is locked by the locking receiving portion 105d and the laying face 300 fixedly attached with the interposing member 130 are fixed. The fixing is carried out for the plurality of female screw portions 130d aligned in the longitudinal direction of the interposing member 130 and the planting bases 100, and the plurality of planting bases 100 are fixed in the longitudinal direction of the prolonged interposing member 130. Other constitution is similar to that of the first embodiment.

Further, instead of a constitution of fixedly attaching the plurality of planting bases 100 to the prolonged interposing member 130 by one-to-many relationship, there can also be constructed a constitution of fixing the single planting base 100 to the single short interposing member 130 to be fixedly attached to each other by a one-to-one relationship. Further, a material of the interposing member 130 is formed pertinently by, for example, a steel plate of stainless steel or aluminum, or resin molding. Further, instead of a constitution of screwing the bolt 110 to the female screw portion 130d of the interposing member 130 previously formed, there can also be constructed a constitution of using the interposing member 130 not formed with the female screw portion 130d and a screw constituting a fixing member, and screwing the screw inserted through the hole portion 105c and projected from the through hole 105e to the top plate 130c of the interposing member 130, by the above-described constitution, boring or the like of forming the female screw portion 130d is dispensed with and low cost formation can be achieved.

The structure of fixing the planting base 100 of the second embodiment achieves an effect of capable of maintaining an excellent outlook of the planting equipment, having a high degree of freedom of construction and excellent in construction performance, capable of smoothly inserting the fixing member of the bolt 110 or the like into the hole portion 105c, and capable of laying the raising member 106 easily and without nonuniformity similar to the first embodiment. Further, the planting base 110 can solidly be fixed to the laying face 300 by fixedly attaching the interposing member 130 to the laying face 300 and locking the head portion 110a to the locking receiving portion 105d. Further, by the constitution of fixedly attaching the interposing member 130 to the laying face 300, the fixing can be carried out without destructing, for example, the laying face 300, the construction performance is promoted more than that in the case of providing the anchor holder 120 and the low cost formation can be constituted. Further, when the screw is used as the fixing member, the screw can be screwed to fix from the top side, and therefore, the construction performance can further be improved.

Third Embodiment

Next, a structure of fixing a planting base of a third embodiment will be explained in details of a portion which differs from the first and the second embodiments.

Figure 7:
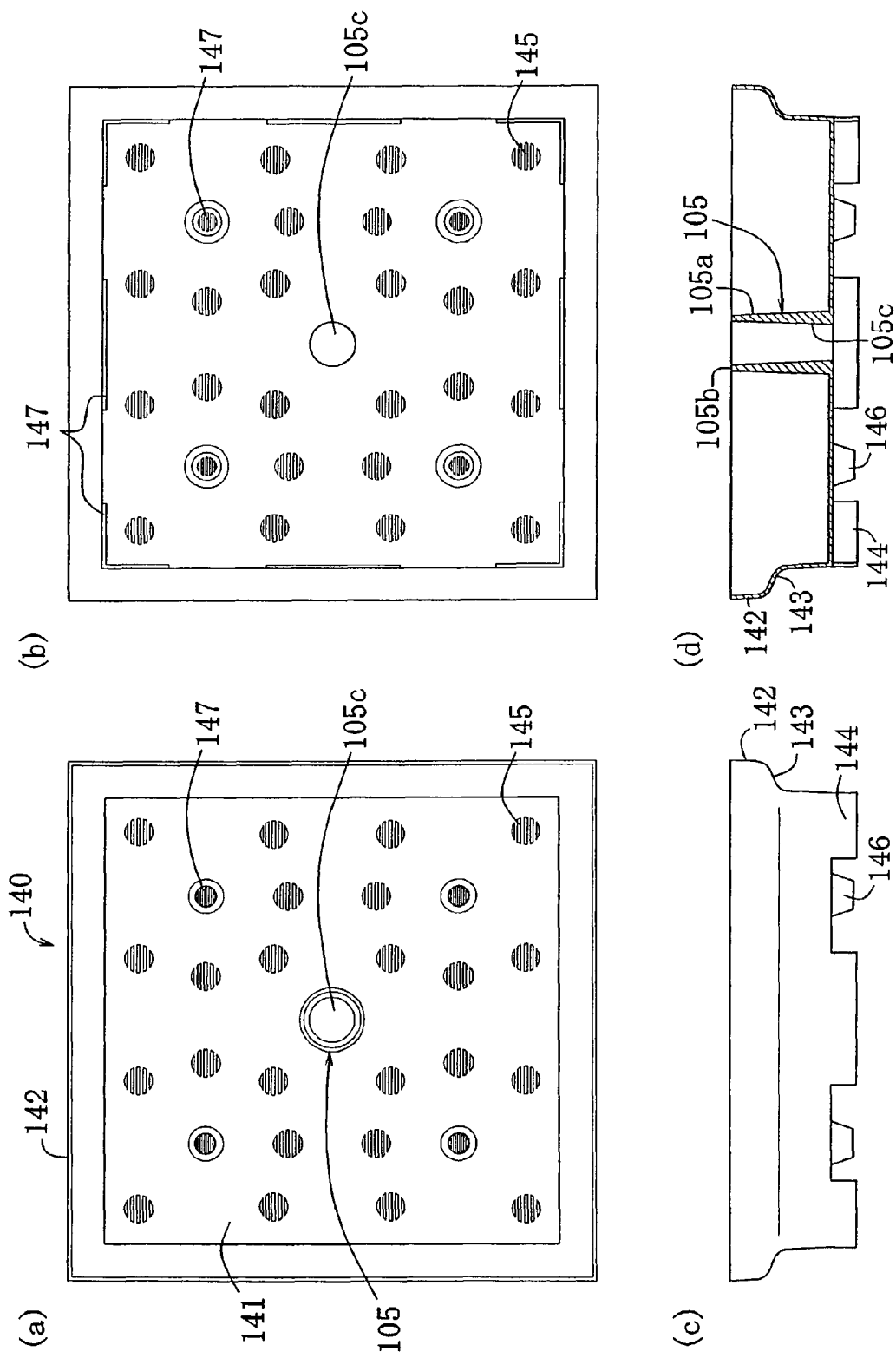
FIG. 7(a) is a plane view showing a planting base (planting container) of a third embodiment.
FIG. 7(b) is a bottom view showing the planting base of FIG. 7(a)
FIG. 7(c) is a front view showing the planting base of FIG. 7(a)
FIG. 7(d) is a sectional view taken along a line A-A of the planting base of FIG. 7(a)

As shown by FIG. 7, a planting base of the third embodiment is a planting container 140 substantially in a box-like shape which includes a bottom plate 141 and a side wall 142 and a top face of which is opened. The side wall 142 of the planting container 140 is formed with an inwardly recessed portion 143 from a middle to a lower portion thereof, further, the bottom plate 141 is provided with a plurality of support legs 144 in an L-like shape or an I-like shape in a bottom view thereof formed by being projected to the bottom side, a plurality of water passing and air passing holes 145 constituting holes in a slit-like shape capable of draining extraneous water to a water storing tray 150, mentioned later, and sending air to a root of the plant 107, and water absorbing projected portions 146 formed to project to the bottom side at vicinities of four corners thereof and bored with water absorbing holes 147 at bottom ends thereof. The water absorbing projected portion 146 can absorb water of the water storing tray 150, mentioned later, from the water absorbing hole 147 by a capillary phenomenon or the like of the raising member 106 filled to the planting container 140.

At substantially a center of the bottom plate 141, the cylinder portion 105 having a shape similar to that of the first embodiment is erected to a height the same as that of upper end of the side wall 142 of the planting container 140. Similar to the first embodiment, the cylinder portion 105 includes the outer peripheral portion 105a a diameter of which is contracted gradually to the top side and the upper end face 105b and the hole portion 105c the diameter of which is gradually contracted to the bottom side, and the hole portion 105c is opened by penetrating the bottom face of the bottom plate 101. An upper end opening of the hole portion 105c is formed to be large by a diameter capable of loosely fitting the bolt 110 and the head portion 110a and an interposing member 160 and a middle seat portion 170, mentioned later, and a lower end opening thereof is formed to be small by a diameter which can insert the bolt 110 and the interposing member 160 and which cannot insert the middle seat portion 170.

Figure 8:
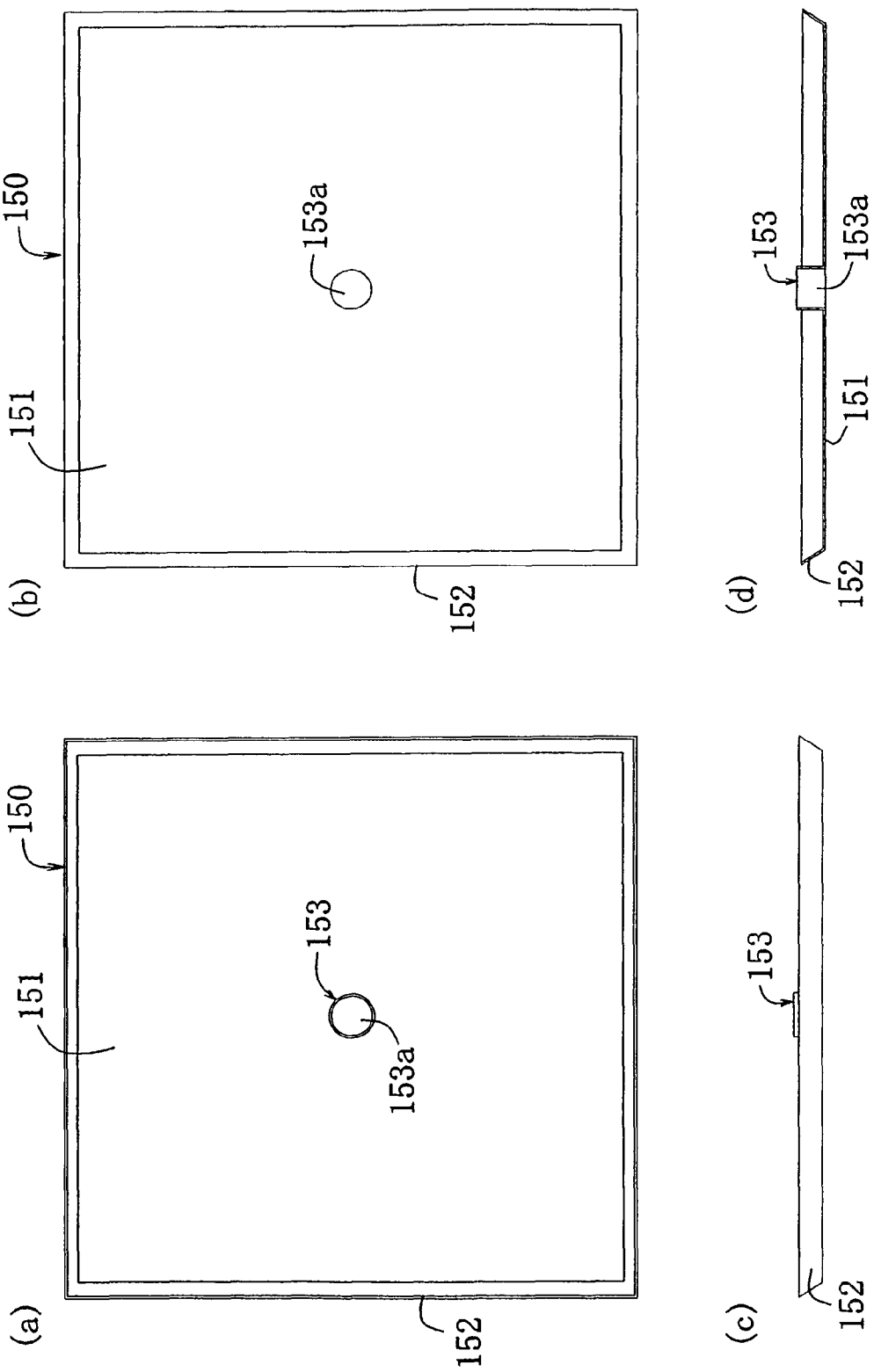
FIG. 8(a) is a plane view showing a water storing portion (water storing tray) of the third embodiment.
FIG. 8(b) is a bottom view showing the water storing portion of FIG. 8(a)
FIG. 8(c) is a front view showing the water storing portion of FIG. 8(a)
FIG. 8(d) is a sectional view taken along a line A-A of the water storing portion of FIG. 8(a)
Figure 9:
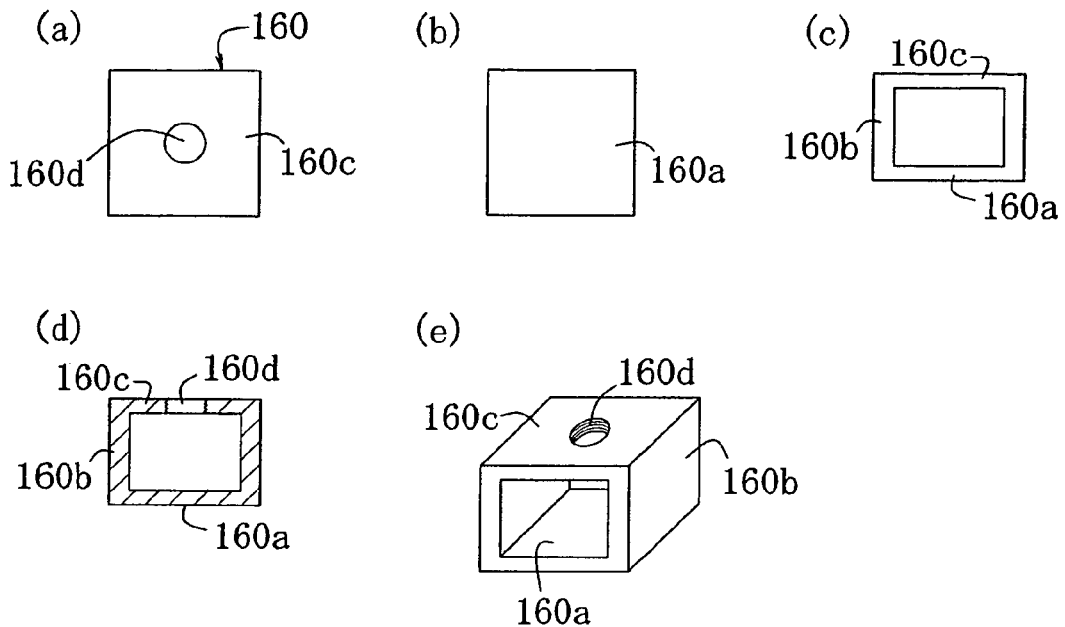
FIG. 9(a) is a plane view showing an interposing member of the third embodiment.
FIG. 9(b) is a bottom view showing the interposing member of FIG. 9(a)
FIG. 9(c) is a front view showing the interposing member of FIG. 9(a)
FIG. 9(d) is a sectional view taken along a line A-A of the interposing member of FIG. 9(a)
FIG. 9(e) is a perspective view showing the interposing member of FIG. 9(a)
Figure 10:
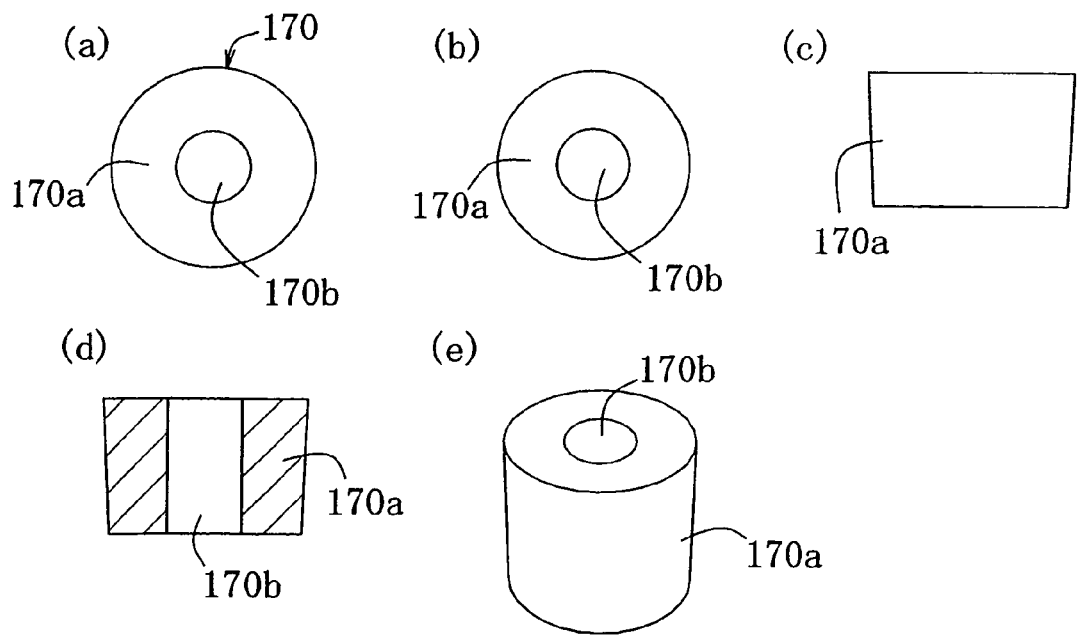
FIG. 10(a) is a plane view showing a middle seat portion of the third embodiment.
FIG. 10(b) is a bottom view showing the middle seat portion of FIG. 10(a)
FIG. 10(c) is a front view showing the middle seat portion of FIG. 10(a)
FIG. 10(d) is a sectional view taken along a line A-A of the middle seat portion of FIG. 10(a)
FIG. 10(e) is a perspective view showing the middle seat portion of FIG. 10(a)

Further, as shown by FIG. 8, the water storing tray 150 according to the third embodiment includes a bottom plate 151 and a side wall 152 in a taper shape widened to the top side, and formed with a cylinder portion 153 in a shape of a circular cylinder which is projected to the top side and top and bottom sides of which are opened at a position of a center of the bottom plate 151 in a plane view thereof and corresponding to the planting container cylinder portion 105. A top end of the cylinder portion 153 is higher than a top end of the side wall 152 and is constituted by a height substantially the same as a height of the support leg 144 of the planting container 140. Further, a hole portion 153*a* of the cylinder portion 153 is formed by a diameter capable of inserting the interposing member 160, mentioned later, and is formed by a diameter substantially the same as that of the hole portion 105*c* of the planting container cylinder portion 105. Further, as shown by FIG. 9, the interposing member 160 is constituted by substantially a shape of a hollow and short square cylinder, notation 160*a* designates a bottom plate, notation 160*b* designates a side wall, notation 160*c* designates a top plate, and notation 160*d* designates a female screw portion. Further, as shown by FIG. 10, the middle seat portion 170 is constituted by substantially a shape of a hollow and short circular cylinder, notation 170*a* designates a peripheral wall having a thick wall thickness, notation 170*b* designates a through hole. An outer peripheral face of the peripheral wall 170 of the middle seat portion 170 is gradually contracted to the bottom side to constitute an inclined face matching the shape of the planting container hole portion 105*c*.

Figure 11:
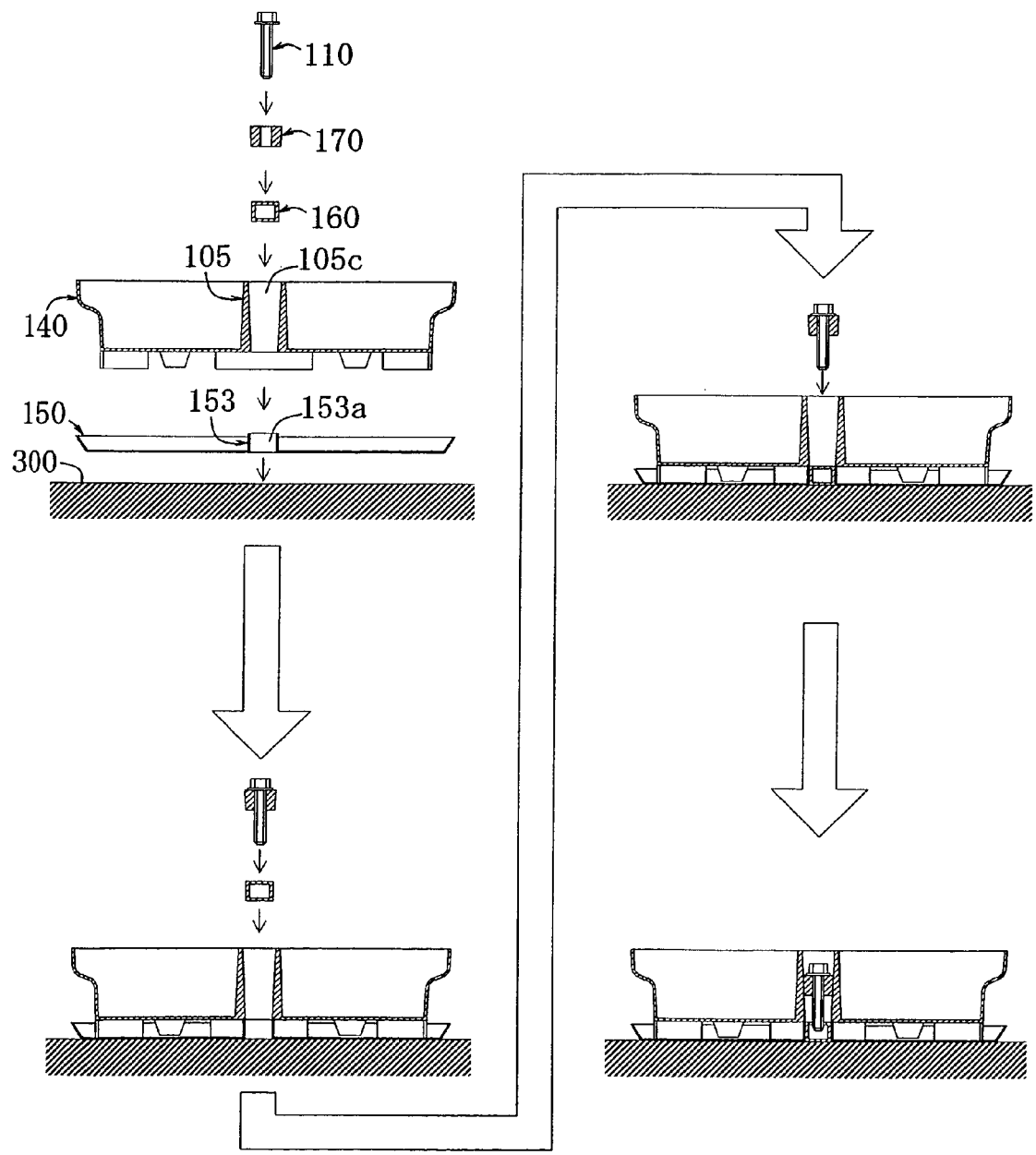
FIG. 11 is an explanatory view for explaining a procedure of fixing the planting base of the third embodiment.

When the planting container 140 and the water storing tray 150 are fixed to the laying face 300, as shown by FIG. 11, the water storing tray 150 is laid to the laying face 300, the cylinder portion 153 of the water storing tray 150 and the cylinder portion 105 of the planting container 140 are correspondingly arranged and the planting container 140 is mounted to the water storing tray 150. By mounting by the corresponding arrangement, the hole portions 153*a* and 105*c* of the cylinder portions 153 and 105 are communicated and a series of spaces substantially in a linear shape are formed from the upper end of the planting container cylinder portion 105 to the laying face 300. Further, positions of mounting the water storing tray 150 and the planting container 140 may be made to be able to be positioned to fix by engaging a projected portion and a recessed portion or the like of the water storing tray 150 and the planting container 140 by constructing a constitution of, for example, forming a projection of a shape of a circular pillar projected to the top side at the bottom plate 151 of the water storing tray 150 and forming a projection receiving portion in a shape of a circular cylinder fitted with the projection at the bottom face of the bottom plate 141 of the planting container 140 and fitting the projection and projected receiving portion.

Thereafter, the interposing member 160 is charged to the upper end of the planting container hole portion 105*c* to the bottom side in the communicating spaces in the hole portions 105*c* and 153*a* of the planting container 140 and the water storing tray 150, and the bottom face of the bottom plate 160*a* of the interposing member 160 arranged at inside of the water storing tray hole portion 153*a* is fixed to be attached to the laying face 300 by an adhering agent or a both faces tape or the like. Further, the shaft portion 110*b* of the bolt 110 is inserted from top side to the through hole 170*b* of the middle seat portion 170 to constitute a fixing member, the fixing member is inserted into the communicating spaces from the top end of the planting container hole portion 105*c*, and the bolt shaft portion 110*b* is screwed to the female screw portion 160*d* of the interposing member 160. In the screwing, the middle seat portion 170 is caught by the hole portion 105*c* substantially at a middle portion at which the diameter of the hole portion 105*c* of the planting container cylinder portion 105 and an outer diameter of the peripheral wall 170*a* of the middle seat portion 170 becomes substantially the same, and therefore, the screwing is finished at a position at which the outer peripheral face of the peripheral wall 170*a* of the middle seat portion 170 is brought into contact with and locked by the inner peripheral face of the hole portion 105*c*, and the planting container 140 and the water storing tray 150 are positioned to be fixed to the laying face 300 by fixing the interposing member 160 to the laying face 300, screwing the bolt shaft portion 110*b* to the female screw portion 160*d* and locking the middle seat portion 170 by the hole portion 105*c*. The planting containers 140 and the water storing trays 150 are longitudinally and transversely aligned to be arranged to be fixed similarly respectively, the respective planting containers 140 are filled with the raising member 106 and the plant 107 is planted to the raising member 106.

Further, similar to the second embodiment, a constitution by screwing or the like may be constituted instead of screwing the shaft portion 110*b* of the bolt 110 to the female screw portion 160*d*. Further, a step of filling the raising member 106 to inside of the planting container 140 and a step of planting the plant 107 to the raising member 106 may be carried out after fixing or before fixing the planting base.

The structure of fixing the planting base of the third embodiment achieves an effect of capable of maintaining the excellent outlook of the planting equipment, having a high degree of freedom of construction and excellent in the construction performance, capable of inserting the fixing member of the bolt 110 or the like smoothly into the hole portion 105*c*, capable of laying the raising member 106 easily and without nonuniformity and capable of carrying out the fixing with the excellent construction performance without destructing the laying face 300 similar to the first and second embodiments.

Further, the planting container 140 or the like can solidly be fixed to the laying face 300 by fixedly attaching the interposing member 160 to the laying face 300 and locking the middle seat portion 170 by the hole portion 105*c*. Further, when a screw is used as the fixing member, the fixing can be carried out by screwing the screw from the top side, and therefore, the construction performance is further improved. Further, the interposing member 160 can be fixed to the laying face 300 after laying the plurality of planting bases, and therefore, the construction performance is promoted by being able to omit an operation of marking or the like for previously installing, for example, the interposing member 160. Further, when the raising member 106 is filled to inside of the planting container 140 at, for example, a plant to be carried to a construction site under the state, even when the raising member 106 is brought into the cylinder portion 105 due to swing of the transportation, the raising member 106 is dropped to the bottom side by the hole portion 105*c* upper and lower sides of which are opened, and therefore, a situation of constituting a hazard of a fixing operation by clogging the raising member 106 into the hole portion 105*c* can be prevented. Further, the fixing structure by the interposing member 160, the middle seat portion 170 and the bolt 110 can be pertinently used or not used as necessary by a situation of the construction site or the like and the fixing structure can easily be added.

Fourth Embodiment

Next, a structure of fixing the planting base of a fourth embodiment will be explained in details of a portion which differs from the first through the third embodiments.

Figure 12:
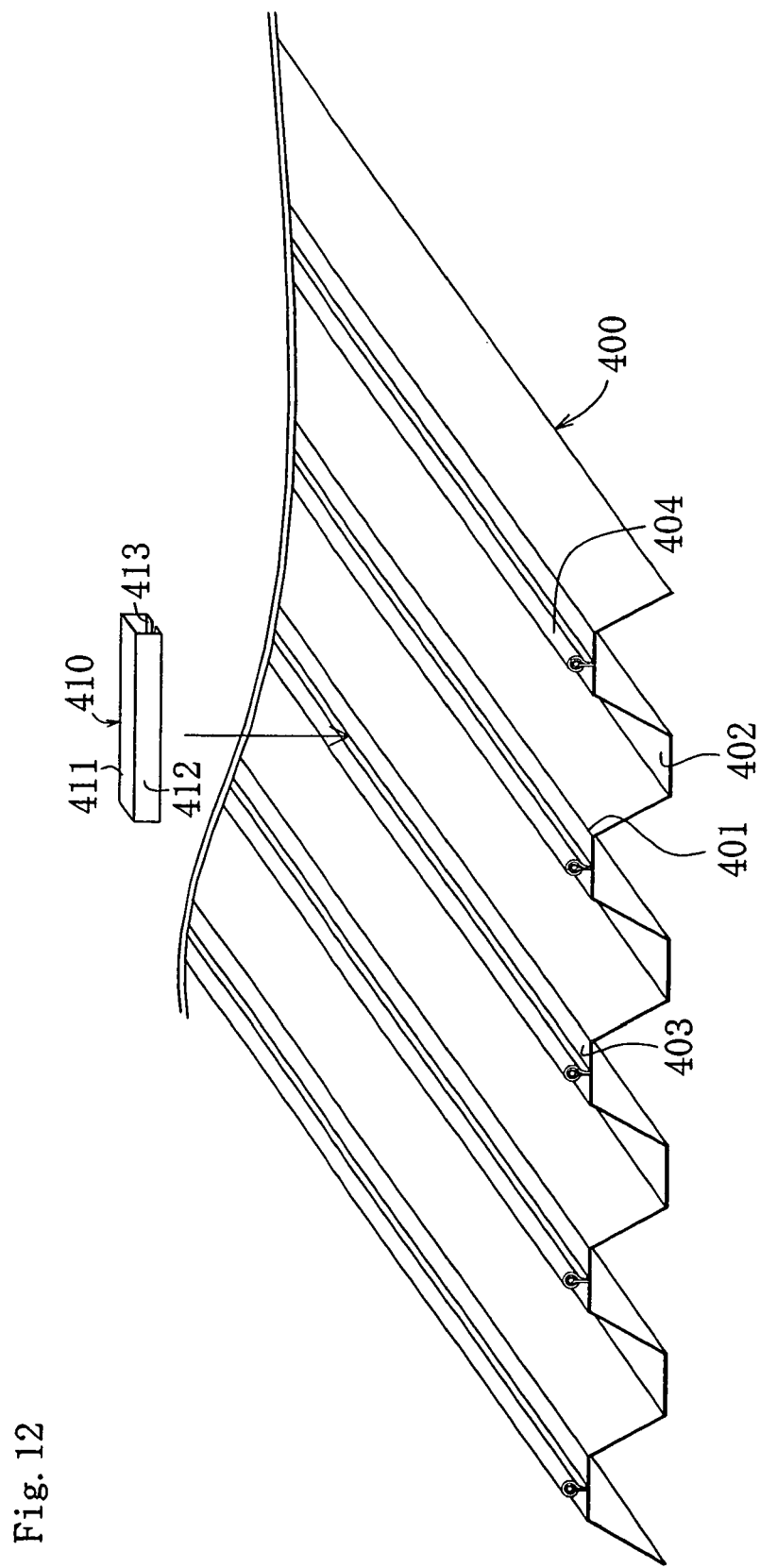
FIG. 12 is a perspective explanatory view showing a folded plate roof and a backing member of a fourth embodiment.
Figure 13:
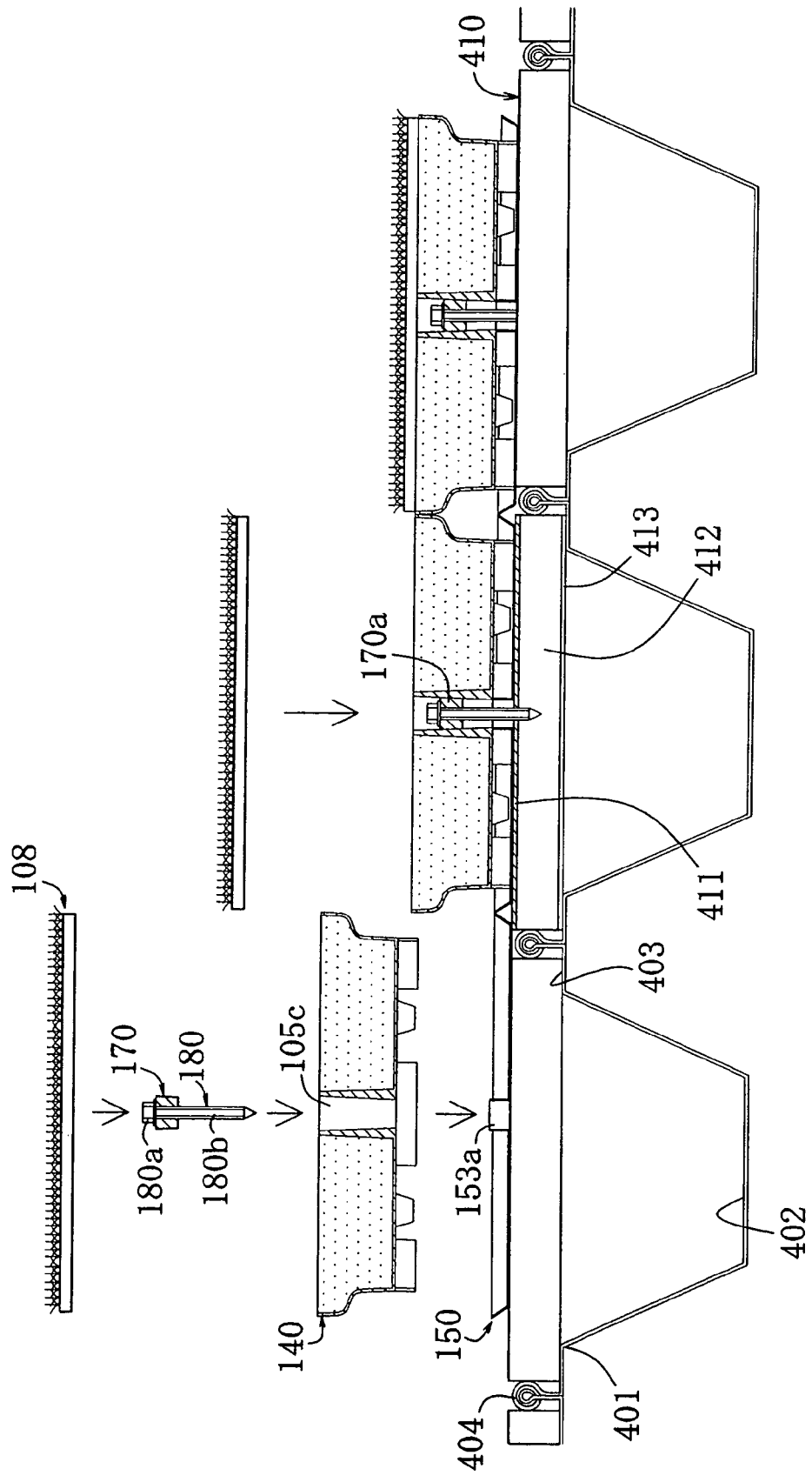
FIG. 13 is a vertical sectional explanatory view for explaining a structure of fixing a planting base of the fourth embodiment to the folded plate roof.

The fixing structure of the fourth embodiment installs to fix the planting container 140 (planting base) and the water storing tray 150 of constitutions the same as those of the third embodiment not to the flat laying face 300 but to a folded plate roof 400 shown in FIG. 12 and FIG. 13. The folded plate roof 400 according to the embodiment is alternately and continuously formed with ridge portions 401 and valley portions 402 extended in a streak-like shape, and substantially a center of a substantially horizontal ridge portion top face 403 of the ridge portion 401 is provided with a connecting portion 404 extended in a longitudinal direction of the ridge portion 401 to project to a top side. The connecting portion 404 connects constituent members constituting the ridge portions 401 and the valley portions 402 of the folded plate roof 400.

When the planting container 140 and the water storing tray 150 are laid at the folded plate roof 400, as shown by FIG. 12 and FIG. 13, a backing member 410 is hung to mount on the ridge portion top faces 403.cndot.403 installed on inner sides of the connecting portions 404.cndot.404 contiguous to each other and the backing member 410 is installed to be hung between the contiguous ridge portions 401.cndot.401. The backing member 410 is constituted by substantially a channel-like shape in a sectional view thereof and includes a top plate 411, side walls 412 extended from both side ends of the top plate 411 to the bottom side, and a flexing piece 413 flexed to an inner side from a lower end of the side wall 412. A bottom face of the flexing piece 413 of the hung backing member 410 is fixedly attached to the top face 403 of the ridge portion 401 by an adhering agent or a both faces tape or the like, and a top face of the top plate 411 of the hung and installed backing member 410 is arranged at a position higher than a top end of the connecting portion 404.

Further, the water storing tray 150 is mounted above the backing member 410 such that the top plate 411 of the backing member 410 is disposed on a bottom side of the cylinder portion 153, the cylinder portions 105 and 153 are correspondingly arranged at inside of the water storing tray 150 and the planting container 140 is mounted. Thereafter, further, a screw 180 a shaft portion 180*b* of which is inserted to the middle seat portion 170 constituting the fixing member is inserted from a top side to the communication hole portions 105*c* and 153*a* of the correspondingly arranged cylinder portions 105 and 153 of the planting container 140 and the water storing tray 150, and the screw 180 is screwed to the top plate 411 of the backing member 410 until the peripheral wall 170*a* of the middle seat portion 170 locked by a screw head portion 180*a* is brought into contact with an inner face of the hole portion 105*c* to be unable to move to the lower side. By screwing the screw 180, the screw 180 and the backing member 410 are fixed, by bringing the outer peripheral face of the middle seat portion peripheral wall 170*a* in the taper shape converged to the lower side in a sectional view thereof into contact with an inner peripheral face of the hole portion 105*c* in the taper shape converged to the bottom side in a sectional view thereof, the planting container 140 is locked by the middle seat portion 170 to be positioned to be fixed to the backing member 410 and the ridge portion top face 403. Further, the screw 180 is inserted to inside of the cylinder portion 153, and also the water storing tray 150 pressed to the bottom side by the support leg 144 of the planting container 140 is positioned to be fixed to the backing member 410 and the ridge portion top face 403. According to the example, the backing member 410 corresponds to the interposing member and the ridge portion top face 403 corresponds to the laying face. Thereafter, the raising member 106 is filled to inside of the laid planting container 140, and the planting mat 108 is mounted onto the raising member 106, or the plant 107 is planted to the raising member 106.

Further, when a plurality of sets of the planting containers 140 and the water storing trays 150 are longitudinally and transversely aligned to be arranged, although there may be constructed a constitution of arranging the backing member 410 among the respective ridge portion top faces 403.cndot.403 to be arranged to be spaced apart from each other by predetermined intervals in the longitudinal direction of the ridge portion 401 and arranging the planting containers 140 and the water storing trays 150 to the respective backing members 410 by a one-to-one relationship, there may be constructed a constitution of supporting the single water storing tray 150 by the plurality of backing members 140 of supporting the water storing tray 150 by 3 pieces of the backing members 140 by providing the backing members 140 which are not fixed with the screws 180 on left and right sides of the backing members 140 fixed with the screw 180 or the like. Further, instead of a constitution fixed by the screw 180, there may be constructed a constitution of boring a female screw portion at the top plate 411 of the backing member 410 and screwing the bolt 110 to the female screw portion similar to the above-described.

The structure of fixing the planting base of the fourth embodiment achieves an effect of capable of maintaining the excellent outlook of the planting equipment, having a high degree of freedom of construction and excellent in a construction performance, capable of smoothly inserting the fixing member of the bolt 180 or the like into the hole portion 105*c*, capable of laying the raising member 106 easily and without nonuniformity, capable of carrying out the fixing by the excellent construction performance without destructing the laying face, capable of solidly fixing the planting container 140 or the like, capable of promoting the construction performance by fixing by screwing the screw, and capable of preventing a situation of constituting a hazard of the fixing operation by clogging the raising member 106 to the hole portion 105*c* or the like similar to the first through the third embodiments. Further, the construction can fix the planting equipment also to the folded plate roof 400 and can meet various requests of a user for the planting equipment.

Fifth Embodiment

Next, a structure of fixing a planting base of a fifth embodiment will be explained in details of a portion which differs from the first through the fourth embodiments.

The structure of fixing the planting base of the fifth embodiment is a structure of fixing a planting container 190 constituting a planting base and a water storing tray 210 to the laying face 300 similar to the third and the fourth embodiments.

Figure 14:
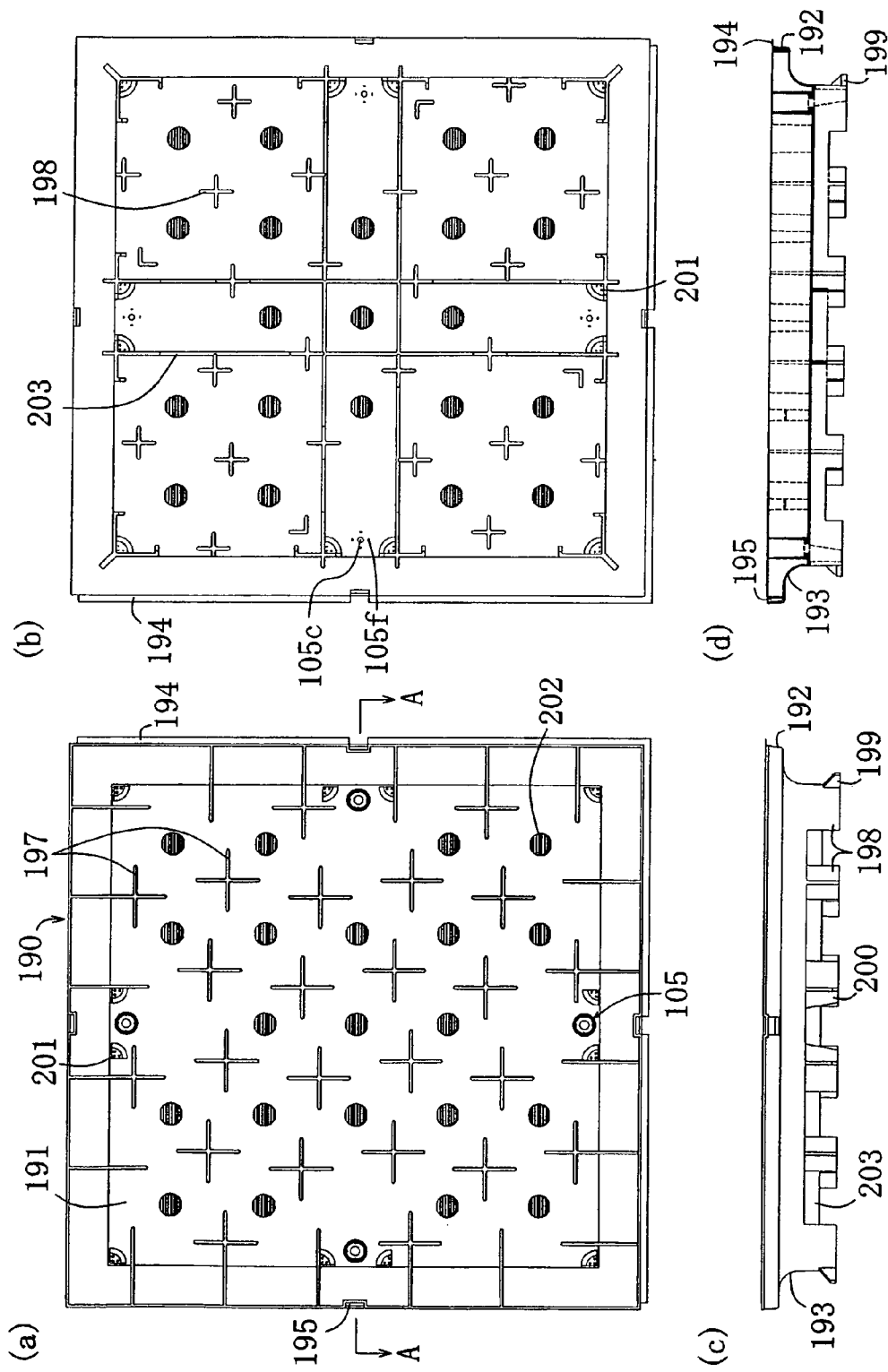
FIG. 14(a) is a plane view showing a planting base (planting container) of a fifth embodiment.
FIG. 14(b) is a bottom view showing the planting base of FIG. 14(a)
FIG. 14(c) is a front view showing the planting base of FIG. 14(a)
FIG. 14(d) is a sectional view taken along a line A-A of the planting base of FIG. 14(a)

As shown by FIG. 14, the planting container 190 according to the fifth embodiment is substantially constituted by a shape of a box which includes a bottom plate 191 and a side wall 192 and a top face of which is opened, and the side wall 192 is formed with an inwardly recessed portion 193 from a middle side to a lower portion thereof. Upper ends of the side walls 192.cndot.192 of two sides contiguous to each other are formed with a horizontal piece 194 flexed outward at a position more or less higher than upper ends of the side walls 192.cndot.192 of other two sides contiguous to each other by an amount of a plate thickness or the like, when the planting containers 190 are aligned, a gap between the side walls 192.cndot.192 of the planting containers 190.cndot.190 contiguous to each other can be covered from a top side by the horizontal piece 194 to be unable to be recognized optically.

Figure 16:
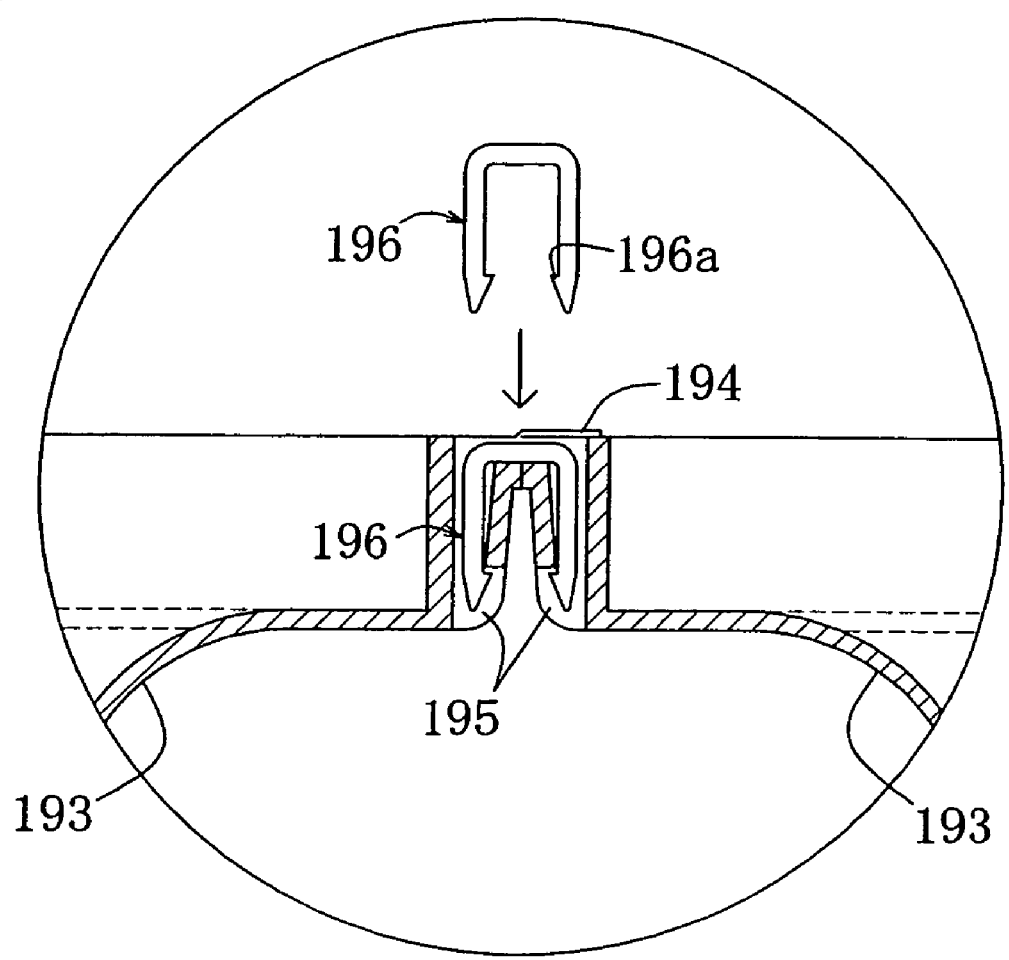
FIG. 16 is an enlarged explanatory view showing a connecting engaging structure of the planting bases (planting containers) of the fifth embodiment.

As shown by FIG. 14 and FIG. 16, upper ends of substantially centers of the respective side walls 192 of four sides of the planting container 190 are formed with connecting/engaging receive portions 195 each of which is surrounded by an inner wall and an outer wall shorter than the inner wall and two left and right walls and a bottom face of which is opened. At a portion of forming the connecting/engaging receive portion 195, a top end of the side wall 192 is formed to be slightly low, and only a vicinity of an upper end of the outer wall is formed with a thick wall thickness, and the connecting/engaging receive portion 195 is constituted by a bifurcated shape in a sectional view thereof. When the planting containers 190.cndot.190 are aligned contiguous to each other, a space of substantially O-like shape in a sectional view thereof is formed by the connecting/engaging receive portions 195.cndot.195 contiguous to each other, and the planting containers 190.cndot.190 are connected to engage to each other by engaging a connecting member 196 substantially in a U-like shape into the space. In connecting to engage the planting containers, locking projections 196a-196a projected to form at an inner sides of two front ends of the connecting member 196 are engaged with open stepped portions of lower ends of the outer walls.

Further, at positions in correspondence with substantially centers of the respective side walls 192 of four sides of the planting container bottom plate 191, there is formed the cylinder portion 105 including the locking receive portion 105d at the hole portion 105c constituted by a shape similar to that of the second embodiment. A plurality of four or the like of small holes 105f penetrated in an up and down direction are bored at vicinities of a peripheral end of the locking receive portion 105d, when the through hole 105e or the like is closed by inserting the bolt 110 or the screw 180 into the hole portion 105c to fasten, water stored at inside of the hole portion 105c by rainfall or the like is drained by passing the small hole 105f and the bolt 110 or the screw 180 or the like can be prevented from being rusted. Further, by isolating a planting region at inside of the planting container 190 by the cylinder portion 105 of the fixing portion, the root of the plant 107 can be prevented from being brought into the fixing portion.

The planting container bottom plate 191 is erected with a plurality of pillar members 197 of substantially a cross-like shape in a plane view thereof projected to the top side, a load of a stepping pressure or the like from the top side is supported by the pillar-like member 197 and solidifying the raising member 106 filled into the planting container 190 and damage to the plant 107 can be reduced. A bottom face of the bottom plate 191 is formed with reinforcement ribs 203 of a shape of parallel crosses to project to the bottom side by a small projection rate, a plurality of support legs 198 substantially in a cross shape, an L-like shape or the like are formed to project to the bottom side at positions the same as those of the pillar-like members 197 in a plane view thereof, support legs 198 provided at corner portions or portions along sides of the side walls 192 are projected to be formed with auxiliary support legs 199 for reinforcing the support legs 198 to prevent the planting container 190 from falling down when a load is applied unevenly to the top side of the inwardly recessed portion 193 of the planting container side wall 192.

Further, at positions in correspondence with vicinities of four corners of the bottom plate 191 or sides of the side walls 192, water absorbing projected portions 200 substantially in a fan-like shape in a plane view thereof formed to be projected to the bottom side and bored with water absorbing holes 201 at lower ends thereof are provided, water at inside of a water storing tray 210, mentioned later, can be absorbed from the absorbing hole 201 by a capillary phenomenon or the like of the raising member 106 filled to the planting container 190, and a water passing and air passing hole 202 similar to the third embodiment is bored at the bottom plate 191.

Figure 15:
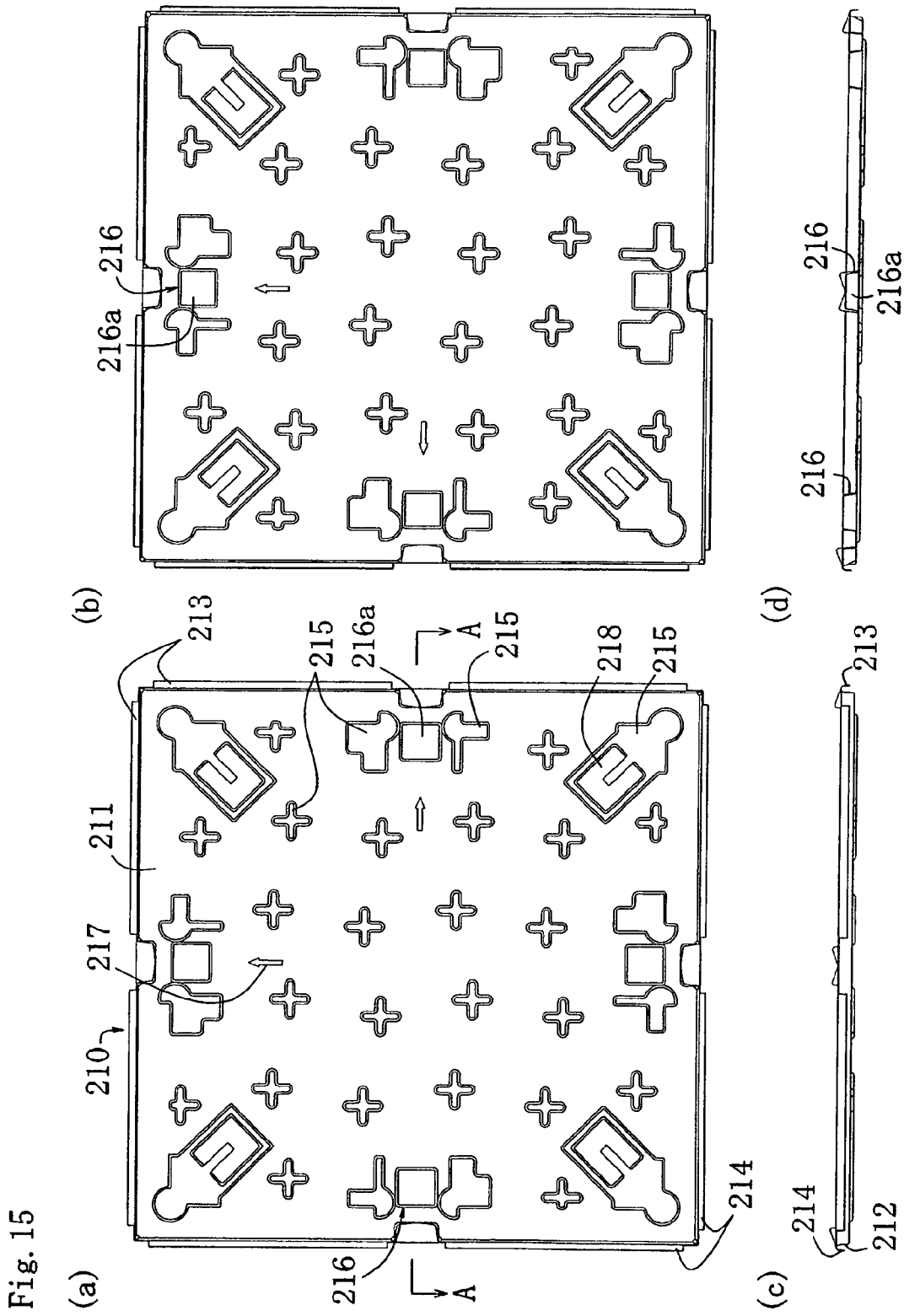
FIG. 15(a) is a plane view showing a water storing portion (water storing tray) of the fifth embodiment.
FIG. 15(b) is a bottom view showing the water storing portion of FIG. 15(a)
FIG. 15(c) is a front view showing the water storing portion of FIG. 15(a)
FIG. 15(d) is a sectional view taken along a line A-A of the water storing portion of FIG. 15(a)

Further, as shown by FIG. 15, the water storing tray 210 is constituted by substantially a shape of a box which includes a bottom plate 211 and a side wall 212 and can store water and a top face of which is opened. An upper end of the side wall 212 is formed with a connecting/engaging portion capable of connecting and engaging the water storing trays 210 contiguous to each other. The connecting/engaging portion is constituted by wide width connecting/engaging pieces 213 substantially in a shape of hooks having wide widths formed at upper ends of the side walls 212 of two sides contiguous to each other, and narrow width connecting/engaging pieces 214 substantially in a shape of a hook in a sectional view thereof having narrow widths formed at upper ends of the side walls 212 of other two sides contiguous to each other, and the water storing trays 210.cndot.210 are connected and engaged to each other by mounting and engaging the wide width connecting/engaging piece 213 of the water storing tray 210 on one side to the narrow width connecting/engaging piece 214 of the water storing tray 210 on other side to cover in the water storing trays 210.omega.210 contiguous to each other.

The bottom plate 211 of the water storing tray 210 is formed with a recess portion 215 substantially in a cross shape in a plane view thereof to project to the bottom side at a position in correspondence with the support leg 198, the water absorbing projected portion 200 or the like of the planting container 190 mounted in a plane view thereof, the bottom face of the recess portion 215 is brought into contact with and mounted to the laying face 300, a remaining portion of the bottom plate 210 is arranged more or less on the top side of the laying face 300 and stored water is made to flow to the recess portion 215 at a lower position.

The bottom plate 211 is formed with cylinder portions 216 substantially in a shape of a square cylinder at four portions at vicinities of substantially respective center positions of the side walls 212 of four sides, and the cylinder portion 216 includes a hole portion 216a top and bottom sides of which are opened. The cylinder portion 216 of the water storing tray 210 is formed at a position in correspondence with the planting container cylinder portion 105 in a plane view thereof when the planting container 190 is mounted to inside of the water storing tray 210, and is formed by a height brought into contact with the bottom face of the planting container bottom plate 191, and substantially a series of spaces passing from the upper end of the cylinder portion 105 of the planting container 190 to the laying face 300 are formed. Further, when the height of the cylinder portion 216 is constituted by the height brought into contact with the bottom face of the planting container bottom plate 191 as described above, although a stepping pressure or the like applied to the planting container 190 can be supported also by the cylinder portion 216, which is preferable, the height can be set to a pertinent height in accordance with a necessary amount of storing water of the water storing tray 210, preferably, the height may be the same as or slightly higher than the height of the side wall 212 of the water storing tray 210 in order to reduce a rate of reducing the water storing amount.

Further, the top face of the bottom plate 211 is formed with two arrow marks 217 to be directed to a side of the wide width connecting/engaging piece 213, the wide width connecting/engaging piece 213 and the narrow width connecting/engaging piece 214 are made to be easy to be confirmed to facilitate to construct the two arrow marks 217 at a position lower than the laying face 300 or to be directed to a downstream side. By the construction, in the water storing trays 210 connected and engaged to each other, it is made possible to supply water to, for example, the water storing tray 210 on an upstream side, to make water at inside of the water storing tray 210 on the upstream side flow to the water storing tray 210 on the downstream side by exceeding the wide width connecting/engaging piece 213 and to distribute water to the connected water storing tray 210. Further, at vicinities of four corners of the bottom plate 211, projected portions 218 substantially in a channel-like shape in a plane view thereof and projected to the top side are formed in the recess portions 215 at positions in correspondence with the water absorbing projected portions 200 of the mounted planting container 190 in a plane view thereof, and the projected portion 218 is made to be able to be mounted with a water sensor or the like for detecting presence or absence of water or a water amount in the water storing tray 210.

Figure 17:
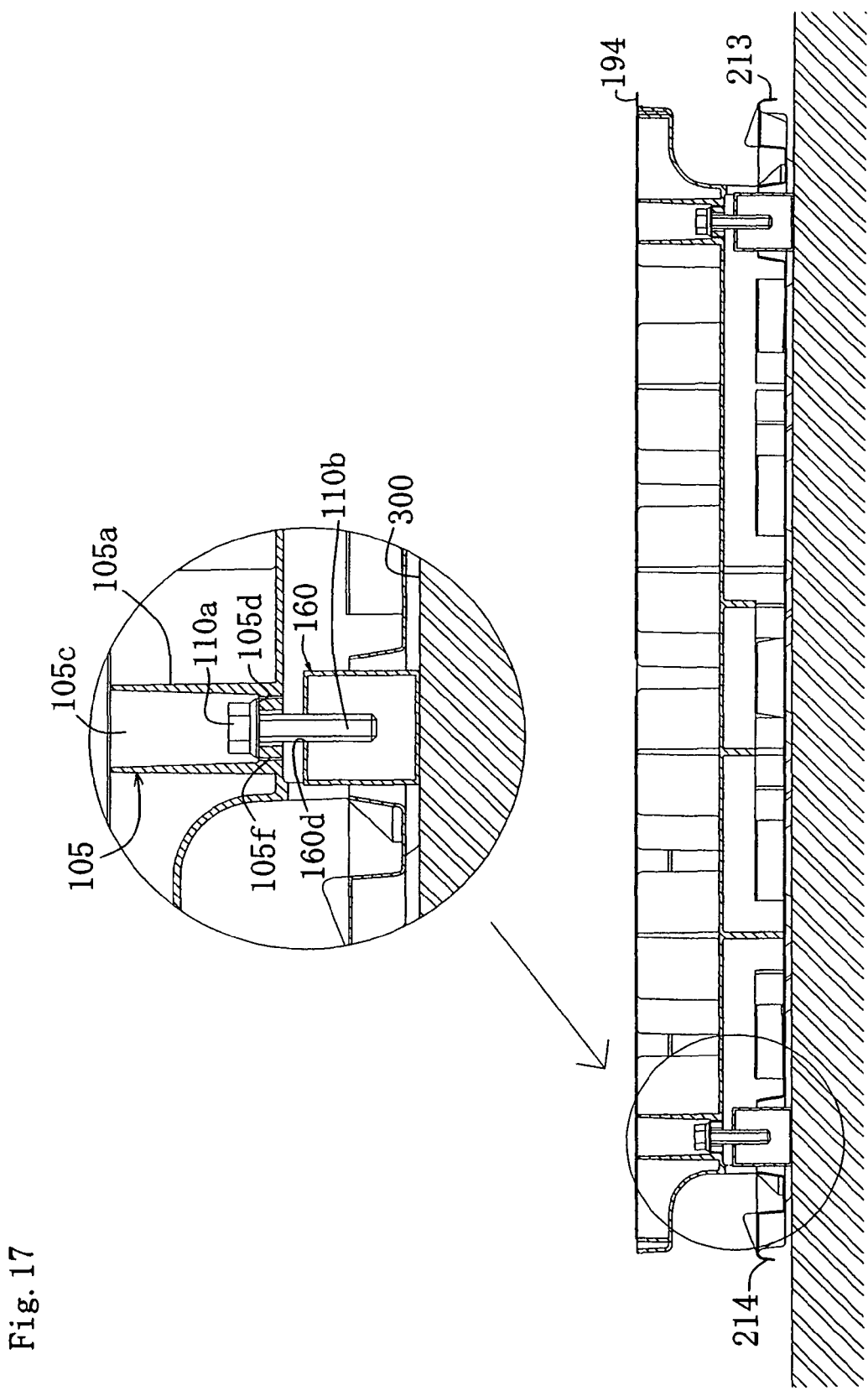
FIG. 17 is a vertical sectional explanatory view for explaining a structure of fixing the planting base of the fifth embodiment.

When the planting container 190 and the water storing tray 210 are constructed to the laying face 300, as shown by FIG. 17, the water storing trays 210 are laid on the laying face 300 by being aligned longitudinally and transversely while being connected and engaged with each other by engaging the wide width connecting/engaging pieces 213 and the narrow width connecting/engaging pieces 214. Thereafter, the short interposing member 160 similar to that of the third embodiment is charged into the cylinder portion 216 of the water storing tray 210 and is fixedly attached to the laying face 300 by an adhering agent, a both faces tape or the like. Thereafter, the planting containers 190 are mounted to insides of the water storing trays 210, the contiguous planting containers 190.cndot.190 are connected and engaged by engaging the connecting/engaging members 196 to the connecting/engaging receive portions 195.cndot.195, the bolts 110 or the like are inserted into the communicating cylinder portions 105 and 216 to be attached to the interposing members 160, thereby, the planting containers 190 and the water storing trays 200 are fixed to the laying face 300. The fixing is carried out for all of the plant containers 190 and the water storing trays 210 which are installed to align, the raising members 106 are filled into the planting containers 190 and the plant 107 is planted to thereby finish the planting equipment.

Similar to the first through the third embodiments, a structure of fixing the planting base of the fifth embodiment achieves an effect of capable of maintaining an excellent outlook of the planting equipment, having a high degree of freedom of construction and excellent in construction performance, capable of inserting a fixing member of the bolt 110 or the like smoothly into the hole portion 105c, capable of laying the raising member 106 easily and without nonuniformity, capable of carrying out the fixing with excellent construction performance without destructing the laying face 300, capable of solidly fixing the planting container 190 and the like to the laying face and the like.

Further, by connecting and engaging the planting containers 190.cndot.190 to each other and connecting and engaging the water storing trays 210.cndot.210 to each other, a stability of installing the planting equipment can be promoted. Further, a strength necessary against a wind pressure per, for example, 1 m.sup.2 can be calculated in accordance with a height of a building, a local area or the like, a planting equipment excellent in a stability can be constituted by fixing the equipment by a minimum fixing member in accordance with a strength, and cost can be reduced by reducing a number of the fixing members. Further, the planting container 190 (planting base) or the like is formed with the plurality of cylinder portions 105 (fixable portion) or the like, and therefore, a number of the fixing members for the single planting container 190 or the like can freely be adjusted by selecting a wind pressure resistant fixing strength in accordance with a construction site based on the calculation. Further, the strength of the single fixing portion can be weakened, and therefore, a strength of adhering the interposing member 160, a strength of the fixing member per se can be also be reduced. Further, the strength of the planting container 190 is increased by providing the stepping pressure preventing structure by the pillar-like member 197 or the like or the reinforcing rib 203.

Further, the small hole 105f for draining is bored at inside of the planting container cylinder portion 216, and therefore, rust of the fixing member, intrusion of the root of the plant or the like can be prevented.

Although an explanation has been given of the first through the fifth embodiments of the invention as described above, otherwise, the invention incorporates, for example, expansions or modulations as follows.

Although in the above-described embodiments, an explanation has been given of a case of fixing the planting base to the laying face 300 according to the first through the third and the fifth embodiments, a case of fixing the planting base to the folded plate roof 400 according to the fourth embodiment, the structures of fixing the planting bases of the respective embodiments are applicable both to the laying face 300 and the folded plate roof 400 by pertinently adjusting the position of the cylinder portion.

Further, the planting base is pertinent to other than the planting base 100 and the planting containers 140 and 190. Further, when the planting container is constituted by the planting base, the constitution of the planting container is pertinent, for example, there may be used a planting container a side wall of which is erected substantially vertically without including an inwardly recessed portion at, for example, a lower portion of the side wall or the like. Further, also the constitution of the water storing portion is pertinent when the water storing portion is used by combining the planting containers, for example, other than the water storing tray 150 or 210 in a shape of a shallow tray, a water storing tank in a box-like shape having a deep depth may be constituted, and a water control can be facilitated by the water storing tank. Further, there may be provided so-to-speak water storing/water draining layer or a water storing/water draining member provided with pluralities of recesses and projections at a board, containing water at a recessed portion and draining water from a drain hole at an upper face of a projected portion. Further, instead of a constitution of providing the water storing portion, a water holding layer of a water holding sheet or the like for holding water may be provided.

Figure 18:
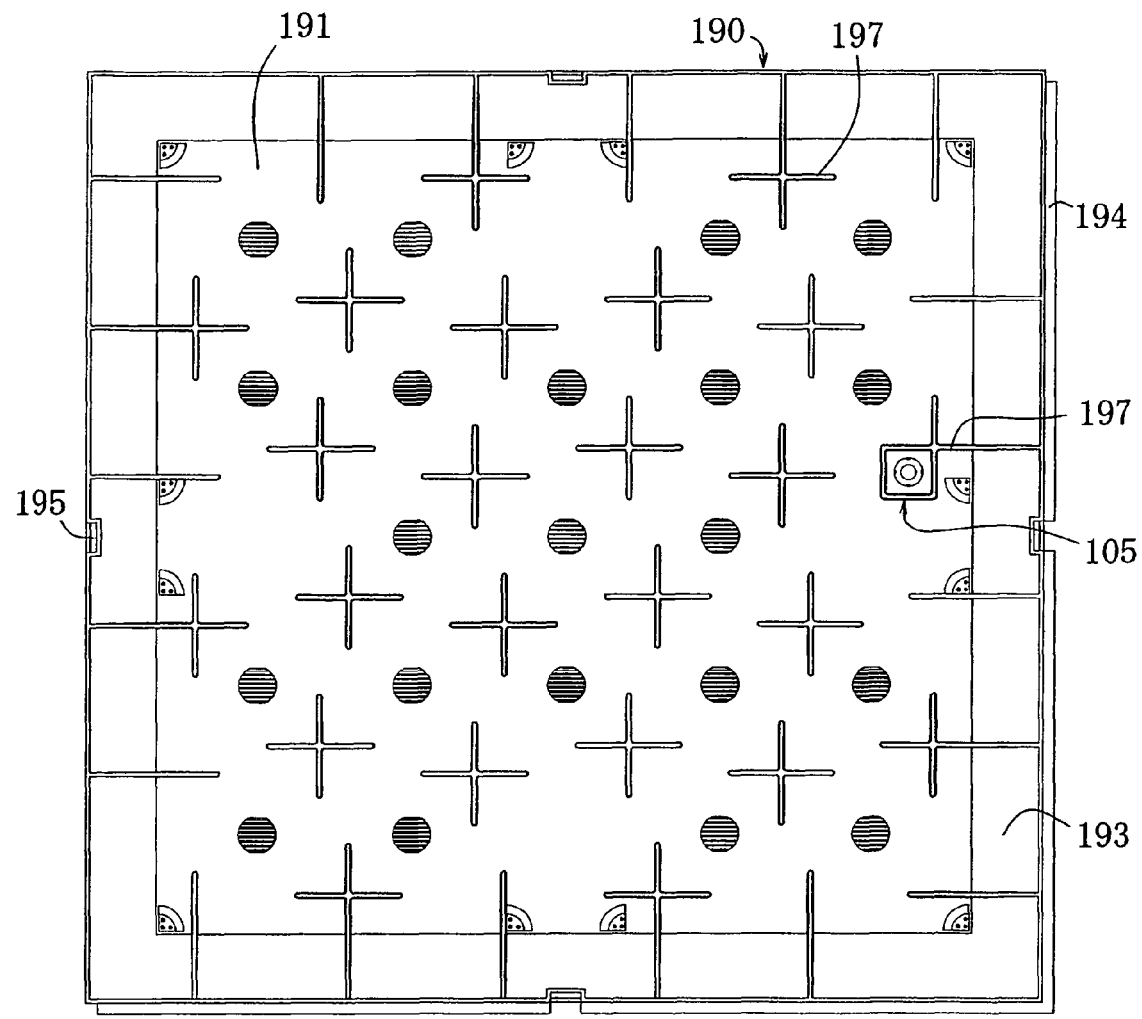
FIG. 18 is a plane view of a planting base (planting container) having a cylindrical portion of other example.

Further, positions and shapes of the cylinder portion of the planting base of the planting container or the like or the cylinder portion of the water storing portion of the water storing tray are not limited to those of the above-described embodiments but, as shown by, for example, FIG. 18, the side plate of the pillar-like member 197 shown in the fifth embodiment may also be used at a portion of the side wall of the cylinder portion 105 of the planting container 190, and the cylinder portion integrated partially with the pillar-like member may be used. By the constitution, the strength of the pillar-like member 197 or the like can be increased and the planting container or the like can be constituted by low cost formation by reducing an amount of a resin when the planting container is molded by the resin.

Figure 19:
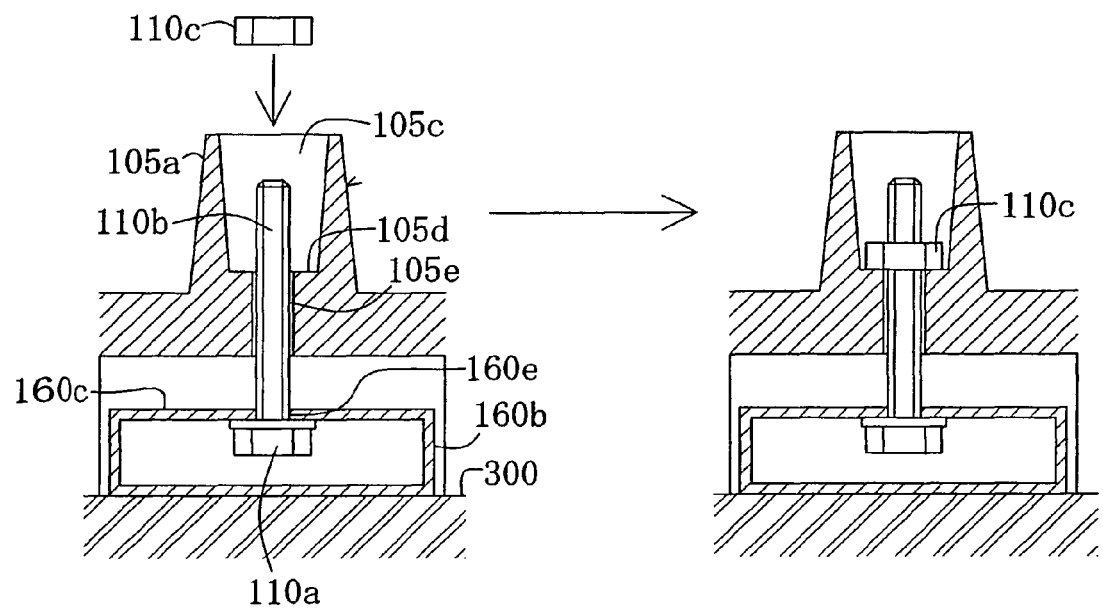
FIG. 19 is a vertical sectional explanatory view for explaining a structure of fixing the planting base of a sixth embodiment.
Figure 20:
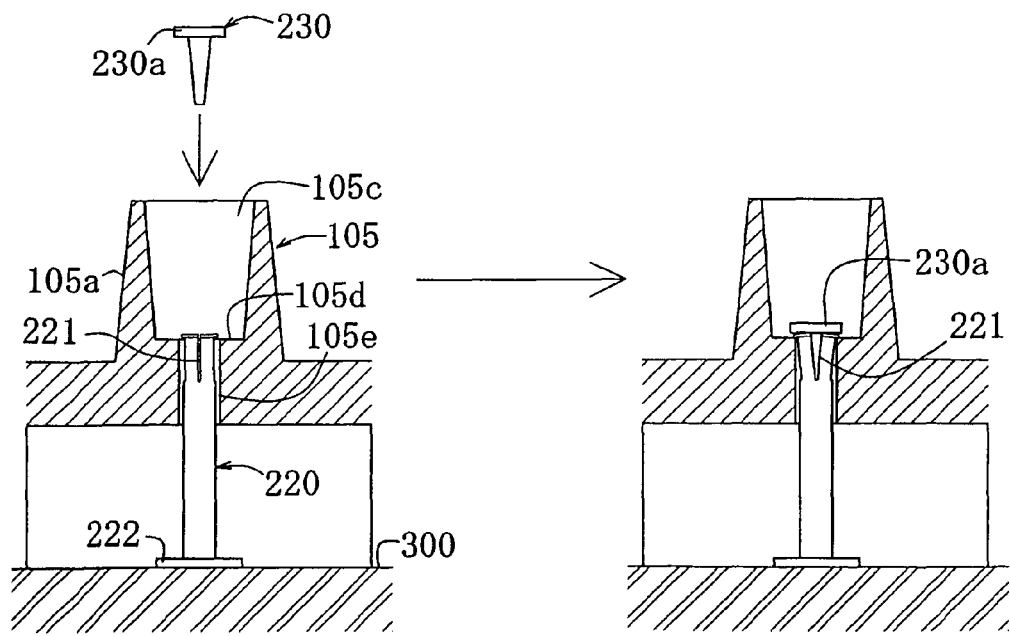
FIG. 20 is a vertical sectional explanatory view for explaining a structure of fixing a planting base of a seventh embodiment and FIG. 21 is a vertical sectional explanatory view for explaining a structure of fixing a planting base of an eighth embodiment.

Further, the fixing member of the bolt or the like and the interposing member and the fixing structure thereby are not limited to those of the above-described embodiments but, as shown by a sixth embodiment of FIG. 19, there may be constructed a constitution in which a cut groove 160e or a hole cut in a longitudinal direction is formed at an upper plate 160c of an interposing member 160 having a low side wall 160b, the interposing layer 160 is fixedly attached to the laying face 300 by an adhering agent, a both faces tape or the like, the bolt 110 is fitted to be erected such that the head portion 110a is disposed on a bottom side and is brought into contact with a bottom face of the upper plate 160c, the shaft portion 110b is inserted to the through hole 105e from a bottom side, a nut 110c constituting a fixing member is screwed to the shaft portion 110b from a top side at inside of the hole portion 105c, and the nut 110c is brought into contact with and locked by the locking receive portion 105d. Further, as shown by, for example, a seventh embodiment of FIG. 20, there may be constructed a constitution in which a notch 221 extended in an up and down direction from an upper end having a height substantially the same as that of the locking receive portion 105d is formed, a cylindrical member 220 having a support plate 222 at a bottom end thereof is used as the interposing member, the support plate 222 is fixedly attached to the laying face 300 by adhering or the like to erect the cylindrical member 220, a top portion of the cylindrical member 220 is inserted into the through hole 105e, a pin 230 constituting a fixing member is pushed from an upper opening of the cylindrical member 220 to push to widen the notch 221 at inside of the hole portion 105c and a head portion 230a of the pin 230 is brought into contact with and locked by the locking receive portion 105d.

Figure 21:
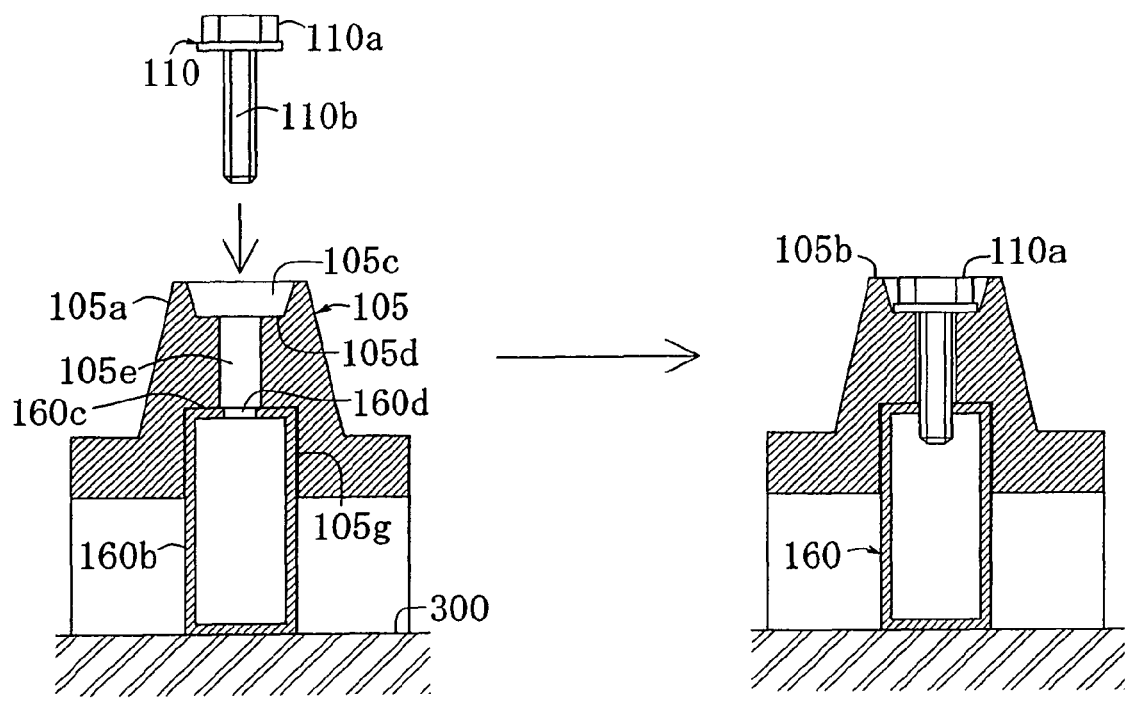

Further, in a positional relationship between the upper end of the fixing member of the bolt 110 or the like in a fixed state and the upper end of the cylinder portion, an explanation has been given of a case of arranging the upper end of the fixing member at an inner portion lower than the upper end of the cylinder portion 105 in the above-described examples, for example, as in an eighth embodiment shown in FIG. 21, the height of the upper end of the fixing member may be made to be the same as that of the upper end of the cylinder portion. Although similar to the above-described examples, the cylinder portion 105 according to the eighth embodiment includes the outer peripheral portions 105a, the upper end face 105b, the hole portion 105c, the locking receive portion 105d, and the through hole 105e, a depth of the hole portion 105c, that is, a height from the upper end face 105d to the locking receive portion 105d is the same as the height of the head portion 110a, and when the bolt shaft portion 110b is inserted into the through hole 105e and the bottom face of the bolt head portion 11a is locked by the locking receive portion 105d, the top face of the bolt head portion 110a is flush with the cylinder portion upper end face 105b and is arranged at inside of the same flat face. A bottom side of the through hole 105e is formed with a recess portion 105g of a shape of substantially a parallelepiped or a shape of substantially a circular pillar fitted with the interposing member 160, the top portion of the interposing member 160 having the high side wall 160b fixed to attach the laying face 300 is fitted to the recess portion 105g, and the top face of the top plate 160c of the interposing member 160 is brought into contact with the top face of the recess portion 105g. The bolt shaft portion 110b projected from the through hole 105e to the recess portion 105g is screwed to the female screw portion 160d of the interposing member 160 in an attaching operation.

According to the above-described ninth embodiment, the top face of the bolt head portion 110a constituting the top end of the fixing member and the top end face 105b of the cylinder portion 105 constituting the top end of the cylinder portion are flush with each other, and therefore, a load applied to the top end of the cylinder portion 105 can dispersingly be received by the top face of the bolt head portion 110a and the cylinder portion upper end face 105b, further, the top face of the interposing member top plate 160c constituting the top end of the interposing layer is brought into contact with and supported by the recess portion 105b constituting the bottom portion of the planting base, and therefore, the load applied to the top end of the cylinder portion 105 is supported by the laying face 300 by way of the bolt 110 constituting the fixing member and the interposing member 160, a strength against a pressure from the top side can further be increased. Further, when the planting base is molded by the resin, an up and down movement can be restrained when the bottom portion of the bottom plate of the planting base achieves a pressure from the top side, and also loosening of the fixing member by the up and down movement can also be prevented. Further, although there can be constructed a constitution in which the upper ends of the interposing members in the respective examples are not brought into contact with the bottom portion of the planting base, it is preferable to construct a constitution of bringing the upper end into contact with to be supported by the bottom plate of the planting base or the like. Further, by the constitution of fitting the interposing member 160 to the recess portion 105g, a positional shift between the planting base and the interposing member can be prevented such that the movement of the planting base in a horizontal direction is restricted, the planting base can firmly be positioned, and a smooth fixing operation can be carried out even when the fixing by the fixing member is finally carried out by the stable positioning.

Further, when the upper end opening of the cylinder portion 105 is to a degree of being slightly larger than the top end portion of the fixing member of the bolt head portion 110a or the like, an outlook is further promoted. Further, it is preferable that the fixing member of the bolt 110, the screw 180, the pin 230 or the like is made to be attachable by engaging an instrument to the top end face and, for example, it is preferable to form an engaging groove for fastening, for example, the top end face by a screw driver or the like. Further, instead of the constitution of forming the small hole 105f for draining water, grooves extended in an up and down direction may be formed by a pertinent number at the outer periphery of the middle seat portion 170, and a small hole of draining water or the like surrounded by an inner peripheral face of the hole portion 105c and the groove may be provided.

Further, the invention can be constructed by a constitution of fixing the planting base to a wall face by using, for example, the unitized raising member 106a and carrying out a treatment of covering the raising member 106a by a net and can be used also to the wall face by being applied to a wall face of a building or the like in place of the laying face. The constitutions of the respective embodiments are pertinently applicable in a case of greening a wall face and a wall face planting equipment excellent in an outlook can be formed.

INDUSTRIAL APPLICABILITY

The invention can be utilized when a planting equipment using the planting base is installed to, for example, a roof top, a veranda, a folded plate roof, a wall face or the like.

The invention claimed is:
1. A structure for fixing a planting base supporting a planting portion including a raising member and a plant by an upper surface of a bottom portion thereof to a laying face, comprising:
a fixing member inserted into a cylinder portion which is projected from a bottom portion of the planting base upwardly and a top and a bottom side of which are opened, the inserted fixing member being fixed to the laying face by fixing the fixing member directly to the laying face or fixing the fixing member to an interposing member fixedly attached to the laying face, and a top end of the fixing member in the fixed state being arranged in the cylinder portion at a height substantially the same as or below a height of a top end of the cylinder portion,
wherein an inner portion of the cylinder portion is formed with a locking receive portion by which a locking portion of the fixing member is locked.

2. The structure for fixing the planting base according to claim 1, wherein an inner diameter of the cylinder portion contracts from an upper end to a bottom side.

3. The structure for fixing the planting base according to claim 2, wherein the planting base is mounted to a water storing portion or a water holding portion and a cylinder portion of the water storing portion or the water holding portion formed at a position in correspondence with the cylinder portion of the planting base is communicated with the cylinder portion of the planting base, the communicated cylinder portion is arranged with the fixing member or the fixing member and an interposing member and the planting base or the water storing portion or the water holding portion are fixed to the laying face.

4. The structure for fixing the planting base according to claim 3, wherein the interposing member is formed with a slender shape and a plurality of the planting bases are fixed to the single interposing member.

5. The structure for fixing the planting base according to claim 2, wherein the planting base is mounted to a water storing portion or a water holding portion and a cylinder portion of the water storing portion or the water holding portion formed at a position in correspondence with the cylinder portion of the planting base is communicated with the cylinder portion of the planting base, the communicated cylinder portion is arranged with the fixing member or the fixing member and an interposing member and the planting base or the water storing portion or the water holding portion are fixed to the laying face.

6. The structure for fixing the planting base according to claim 5, wherein the interposing member is formed with a slender shape and a plurality of the planting bases are fixed to the single interposing member.

7. The structure for fixing the planting base according to claim 2, wherein the interposing member is formed with a slender shape and a plurality of the planting bases are fixed to the single interposing member.

8. The structure for fixing the planting base according to claim 2, wherein the interposing member is formed with a slender shape and a plurality of the planting bases are fixed to the single interposing member.

9. The structure for fixing the planting base according to claim 2, wherein the interposing member is formed with a slender shape and a plurality of the planting bases are fixed to the single interposing member.

10. The structure for fixing the planting base according to claim 1, wherein the planting base is mounted to a water storing portion or a water holding portion and a cylinder portion of the water storing portion or the water holding portion formed at a position in correspondence with the cylinder portion of the planting base is communicated with the cylinder portion of the planting base, the communicated cylinder portion is arranged with the fixing member or the fixing member and an interposing member and the planting base or the water storing portion or the water holding portion are fixed to the laying face.

11. The structure for fixing the planting base according to claim 10, wherein the interposing member is formed with a slender shape and a plurality of the planting bases are fixed to the single interposing member.

12. The structure for fixing the planting base according to claim 1, wherein the interposing member is formed with a slender shape and a plurality of the planting bases are fixed to the single interposing member.

13. The structure for fixing the planting base according to claim 1, wherein the interposing member is formed with a slender shape and a plurality of the planting bases are fixed to the single interposing member.

* * * * *